US009784355B1

(12) United States Patent
Brammer et al.

(10) Patent No.: US 9,784,355 B1
(45) Date of Patent: Oct. 10, 2017

(54) AXLE DISCONNECT AND DIFFERENTIAL LOCK COMBINATION

(71) Applicant: Dana Heavy Vehicle Systems Group, LLC, Maumee, OH (US)

(72) Inventors: Andrew T. Brammer, Toledo, OH (US); Marcus W. Schmidt, Swanton, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 15/253,225

(22) Filed: Aug. 31, 2016

(51) Int. Cl.
| | |
|---|---|
| *F16H 48/20* | (2012.01) |
| *F16H 48/24* | (2006.01) |
| *B60K 17/36* | (2006.01) |
| *B60K 17/346* | (2006.01) |
| *B60K 17/16* | (2006.01) |
| *F16H 48/08* | (2006.01) |

(52) U.S. Cl.
CPC .......... *F16H 48/24* (2013.01); *B60K 17/165* (2013.01); *B60K 17/346* (2013.01); *B60K 17/36* (2013.01); *F16H 48/08* (2013.01)

(58) Field of Classification Search
CPC ......... F16H 48/24; F16H 48/08; B60K 17/36; B60K 17/165; B60K 17/346
See application file for complete search history.

(56) References Cited

U.S. PATENT DOCUMENTS

| | | | |
|---|---|---|---|
| 4,787,491 A | 11/1988 | Kato | |
| 4,788,888 A | 12/1988 | Tsutsumikoshi | |
| 5,057,062 A | 10/1991 | Yamasaki et al. | |
| 6,450,915 B1 | 9/2002 | Kazaoka et al. | |
| 6,620,073 B2 | 9/2003 | Kazaoka et al. | |
| 6,634,978 B2 | 10/2003 | Banno et al. | |
| 7,951,038 B2 | 5/2011 | Ina et al. | |
| 8,057,347 B2 | 11/2011 | Chiba et al. | |
| 8,725,376 B2 | 5/2014 | Murota et al. | |
| 2004/0089495 A1* | 5/2004 | Strain | F16D 1/112 180/383 |
| 2007/0293364 A1* | 12/2007 | Correia | F16H 48/08 475/300 |
| 2011/0136611 A1* | 6/2011 | Martin, III | F16H 48/30 475/220 |
| 2014/0179483 A1* | 6/2014 | Kahl | F16H 48/06 475/230 |
| 2016/0341260 A1* | 11/2016 | Hirao | F16C 3/02 |

* cited by examiner

*Primary Examiner* — David J Hlavka
(74) *Attorney, Agent, or Firm* — Marshall & Melhorn, LLC

(57) ABSTRACT

An axle disconnect and differential locking system for single or multiple axle vehicles which allows the vehicle to selectively engage and disengage an axle half shaft from the differential side gear. Additionally, the system allows the vehicle to selectively switch between locked and unlocked differential driving modes. The system has a first position, a second position and a third position. At the first position, the system is not meshingly engaged with the differential side gear or the differential case. At the second position, the system is meshingly engaged with the differential side gear but is not meshingly engaged with the differential case. At the third position, the system is engaged with the differential side gear and the differential case. In one embodiment the system is a sliding collar. According to another embodiment, the system includes an axle disconnect collar, a differential locking collar and a biasing member disposed therebetween.

17 Claims, 6 Drawing Sheets

AXLE DISCONNECT AND DIFFERENTIAL LOCK COMBINATION

FIELD OF THE DISCLOSURE

The present disclosure relates to an axle disconnect and differential locking system for a vehicle.

BACKGROUND OF THE DISCLOSURE

Systems for connecting and disconnecting an axle half shaft with a differential and systems for locking and unlocking a differential are known within the industry. In order to incorporate an axle disconnect system and a differential locking system into a vehicle axle requires the two systems to be packaged as two separate components on opposite sides of the axle. It would therefore be advantageous to develop an axle disconnect and differential locking system that is packaged as a single component on the same side of an axle.

Additionally, in order to incorporate the axle disconnect system and the differential locking system into a vehicle axle requires the use of multiple actuators which increases the overall cost associated with the vehicle axle system. It would therefore be advantageous to develop a more cost efficient axle disconnect and differential locking system that requires the use of only one actuator.

SUMMARY OF THE DISCLOSURE

An axle disconnect and differential locking system for a vehicle using a sliding collar that is selectively engagable with a differential side gear and/or a differential case is described. The sliding collar has a plurality of splines extending from an inner surface of the sliding collar and further includes a plurality of clutch teeth extending axially outboard from an end of the sliding collar. The sliding collar is slidingly engaged with an axle half shaft having a plurality of splines extending from the outer surface of the axle half shaft that are complementary to and meshingly engaged with the plurality of splines on the inner surface of the sliding collar. An end of a differential side gear is then rotatably connected to an end of the axle half shaft. Extending from the outer surface of the end of the differential side gear connected to the axle half shaft is a plurality of splines. Surrounding the differential side gear is a differential case having a plurality of clutch teeth extending axially outboard from an end of the differential case.

In order to drive the sliding collar to selectively engage the differential side gear and/or the differential case the outer surface of the sliding collar is driving connected to an end of a shifting fork. The shift fork is in turn driven by an actuator that is integrally connected to a shift shaft which in turn is connected to an end of the shift fork opposite the sliding collar.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments of the invention disclosed are not to be considered as limiting, unless expressly stated otherwise.

Figure 1:
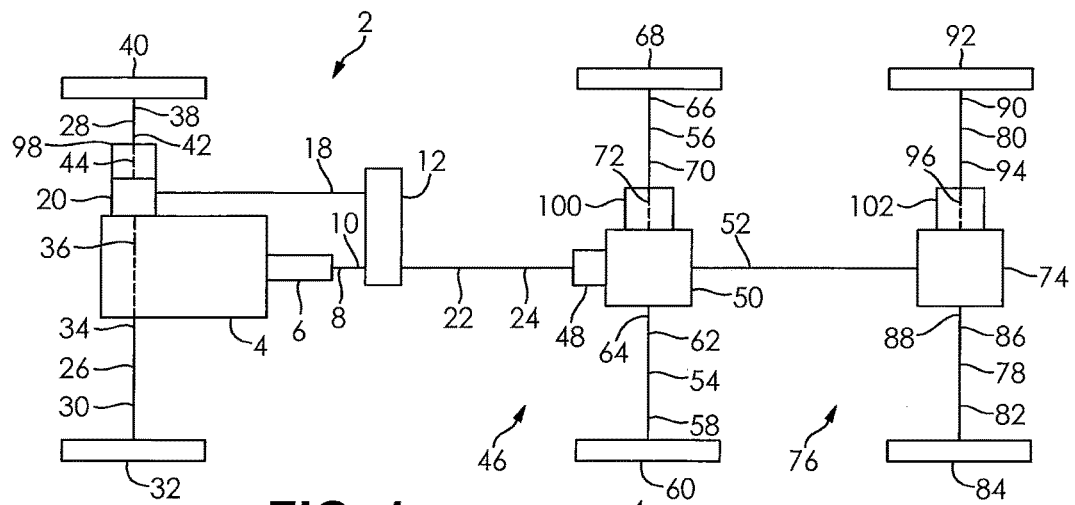
FIG. 1 is a schematic top-plan view of a vehicle having an axle disconnect and differential locking system according to an embodiment of the disclosure.

FIG. 1 is a schematic top-plan view of a vehicle having an axle disconnect and differential locking system according to an embodiment of the disclosure. The vehicle 2 has an engine 4 which is drivingly connected to a transmission 6. A transmission output shaft 8 is then drivingly connected to an end of the transmission 6 opposite the engine 4. The transmission 6 is a power management system which provides controlled application of the rotational power generated by the engine 4 by means of a gear box.

The transmission output shaft 8 is drivingly connected to a transfer case input shaft 10 which in turn is drivingly connected to a transfer case 12. The transfer case 12 is used to transfer the rotational power from the transmission 6 to a front axle system 14 and/or a tandem axle system 16.

A first transfer case output shaft 18 is drivingly connected to a front axle differential 20 of the front axle system 14 and a second transfer case output shaft 22 is drivingly connected to an end of a first propeller shaft 24. The front axle differential 20 is a set of gears that allows the outer drive wheel(s) of a wheeled vehicle 2 to rotate at a faster rate than the inner drive wheel(s). The rotational power is transmitted through the front axle system 14 as described in more detail below.

The front axle system 14 further includes a first front axle half shaft 26 and a second front axle half shaft 28. The first forward tandem axle half shaft 26 extends substantially perpendicular to the first transfer case output shaft 18. A first end 30 of the first front axle half shaft 26 is drivingly connected to a first front axle wheel assembly 32 and a second end 34 of the first front axle half shaft 26 is drivingly connected to an end of a first front axle differential output shaft 36. The first front axle differential output shaft 36 extends co-axially with the first front axle half shaft 26. An end of the first front axle differential output shaft 36 opposite the second end 34 of the first front axle half shaft 26 is drivingly connected to a side of the front axle differential 20.

Extending substantially perpendicular to the first transfer case output shaft 18 is the second front axle half shaft 28. Similarly, a first end 38 of the second front axle half shaft 28 is drivingly connected to a second front axle wheel assembly 40 and a second end 42 of the second front axle half shaft 28 is drivingly connected to an end of a second front axle differential output shaft 44. The second front axle differential output shaft 44 extends co-axially with the second front axle half shaft 28. An end of the second front axle differential output shaft 44 opposite the second front axle half shaft 28, is drivingly connected to a side of the front axle differential 20 opposite the first front axle differential output shaft 36.

The first propeller shaft 24 extends from the second transfer case output shaft 22 and drivingly connects the transfer case 12 to a forward tandem axle system 46 having an inter-axle differential 48. The first propeller shaft 24 may be connected to the inter-axle differential 48 through one or more of the following components (not shown) a drive shaft, a stub shaft, a coupling shaft, a forward tandem axle system input shaft, a pinion gear shaft, an inter-axle differential pinion gear shaft and/or an inter-axle differential input shaft. The inter-axle differential 48 is a device that divides the rotational power generated by the engine 4 between the axles in a vehicle 2. The rotational power is transmitted through the forward tandem axle system 46 as described in more detail below.

As illustrated in FIG. 1 the inter-axle differential 48 is drivingly connected to a forward tandem axle differential 50 and a forward tandem axle system output shaft 52. The forward tandem axle differential 50 is a set of gears that allows the outer drive wheel(s) of a wheeled vehicle 2 to rotate at a faster rate than the inner drive wheel(s).

The forward tandem axle system 46 further includes a first forward tandem axle half shaft 54 and a second forward tandem axle half shaft 56. The first forward tandem axle half shaft 54 extends substantially perpendicular to the first propeller shaft 24. A first end 58 of the first forward tandem axle half shaft 54 is drivingly connected to a first forward tandem axle wheel assembly 60 and a second end 62 of the first forward tandem axle half shaft 54 is drivingly connected to an end of a first forward tandem axle differential output shaft 64. In a non-limiting example, the first forward tandem axle differential output shaft 64 is a separate shaft, a separate stub shaft, a separate coupling shaft, a shaft integrally formed as part of a first forward tandem axle differential side gear, a stub shaft integrally formed as part of a first forward tandem axle differential side gear and/or a coupling shaft integrally formed as part of a first forward tandem axle differential side gear. The first forward tandem axle differential output shaft 64 extends co-axially with the first forward tandem axle half shaft 54. An end of the first forward tandem axle differential output shaft 64 opposite the first forward tandem axle half shaft 54 is drivingly connected to a side of the forward tandem axle differential 50.

Extending substantially perpendicular to the first propeller shaft 24 is the second forward tandem axle half shaft 56. Similarly, a first end 66 of the second forward tandem axle half shaft 56 is drivingly connected to a second forward tandem axle wheel assembly 68 and a second end 70 of the second forward tandem axle half shaft 56 is drivingly connected to an end of a second forward tandem axle differential output shaft 72. In a non-limiting example, the second forward tandem axle differential output shaft 72 is a separate shaft, a separate stub shaft, a separate coupling shaft, a shaft integrally formed as part of a second forward tandem axle differential side gear, a stub shaft integrally formed as part of a second forward tandem axle differential side gear and/or a coupling shaft integrally formed as part of a second forward tandem axle differential side gear. The second forward tandem axle differential output shaft 72 extends co-axially with the second forward tandem axle half shaft 56. An end of the second forward tandem axle differential output shaft 72 opposite the second forward tandem axle half shaft 56, is drivingly connected to a side of the forward tandem axle differential 50 opposite the first forward tandem axle differential output shaft 64.

One end of the forward tandem axle system output shaft 52 is drivingly connected to a side of the inter-axle differential 48 opposite the first propeller shaft 24. The forward tandem axle system output shaft 52 extends from the forward tandem axle system 46 to a rear tandem axle differential 74 of a rear tandem axle system 76. As illustrated in FIG. 1, the end of the forward tandem axle system output shaft 52 opposite the forward tandem axle system 46 is drivingly connected to the rear tandem axle differential 74. The forward tandem axle system output shaft 52 may be connected to the rear tandem axle differential 74 though one or more of the following components (not shown) a drive shaft, a propeller shaft, a stub shaft, a coupling shaft, a rear tandem axle system input shaft, a pinion gear shaft and/or a rear tandem axle differential input shaft. The rear tandem axle differential 74 is a set of gears that allows the outer drive wheel(s) of a wheeled vehicle 2 to rotate at a faster rate than the inner drive wheel(s). The rotational power is transmitted through the rear tandem axle system 76 as described in more detail below.

The rear tandem axle system 76 further includes a first rear tandem axle half shaft 78 and a second rear tandem axle half shaft 80. The first rear tandem axle half shaft 78 extends substantially perpendicular to the forward tandem axle system output shaft 52. A first end 82 of the first rear tandem axle half shaft 78 is drivingly connected to a first rear tandem axle wheel assembly 84 and a second end 86 of the first rear tandem axle half shaft 78 is drivingly connected to an end of a first rear tandem axle differential output shaft 88. In a non-limiting example, the first rear tandem axle differential output shaft 88 is a separate shaft, a separate stub shaft, a separate coupling shaft, a shaft integrally formed as part of a first rear tandem axle differential side gear, a stub shaft integrally formed as part of a first rear tandem axle differential side gear and/or a coupling shaft integrally formed as part of a first rear tandem axle differential side gear. The first rear tandem axle differential output shaft 88 extends co-axially with the first rear tandem axle half shaft 78. An end of the first rear tandem axle differential output shaft 88 opposite the first rear tandem axle half shaft 78 is drivingly connected to a side of the rear tandem axle differential 74.

Extending substantially perpendicularly to the forward tandem axle system output shaft 52 is the second rear tandem axle half shaft 80. Similarly, a first end 90 of the second rear tandem axle half shaft 80 is drivingly connected to a second rear tandem axle wheel assembly 92 and a second end 94 of the second rear tandem axle half shaft 80 is drivingly connected to an end of a second rear tandem axle differential output shaft 96. In a non-limiting example, the second rear tandem axle differential output shaft 96 is a separate shaft, a separate stub shaft, a separate coupling shaft, a shaft integrally formed as part of a second rear tandem axle differential side gear, a stub shaft integrally formed as part of a second rear tandem axle differential side gear and/or a coupling shaft integrally formed as part of a second rear tandem axle differential side gear. The second rear tandem axle differential output shaft 96 extends co-axially with the second rear tandem axle half shaft 80. An end of the second rear tandem axle differential output shaft 96 opposite the second rear tandem axle half shaft 80 is drivingly connected to a side of the rear tandem axle differential 74 opposite the first rear tandem axle differential output shaft 88.

As it can be seen by referencing FIG. 1, the vehicle 2 may further include a forward tandem axle system axle disconnect and differential locking system 98, a rear tandem axle system axle disconnect and differential locking system 100 and/or a front axle system axle disconnect and differential locking system 102.

The front axle system axle disconnect and differential locking system 98 selectively connects and disconnects the second front axle half shaft 28 with the second front axle differential output shaft 44. Additionally, the front axle system axle disconnect and differential locking system 98 illustrated in FIG. 1, selectively locks and unlocks the front axle differential 20. In order to selectively connect and disconnect the second front axle half shaft 28 with the second front axle differential output shaft 44 and to selectively lock and unlock the front axle differential 20, the front axle system axle disconnect and differential locking system 98 translates axially between three positions.

When the front axle system axle disconnect and differential locking system 98 is in a first position (not shown), the front axle system axle disconnect and differential locking system 98 is not engaged with the second front axle differential output shaft 28. In this position, the second front axle differential output shaft 44 is not drivingly connected to the second front axle half shaft 28 thereby preventing the rotational energy from the front axle differential 20 to be transferred to the second front axle half shaft 28. As a result, the second front axle wheel assembly 40 is disconnected from driving engagement with the front axle differential 20.

In addition, when in the first position (not shown), the front axle system axle disconnect and differential locking system 98 is not engaged with the front axle differential 20. In this position, the front axle differential 20 is unlocked allowing a differential action to occur within the front axle differential 20 which allows the outer drive wheel(s) of the wheeled vehicle 2 to rotate at a faster rate than the inner drive wheel(s).

According to this embodiment, when the front axle system axle disconnect and differential locking system 98 is in a second position (not shown), the front axle system axle disconnect and differential locking system 98 is engaged with the second front axle differential output shaft 44. In this position, the second front axle differential output shaft 44 is drivingly connected to the second front axle half shaft 28. This allows the rotational energy from the front axle differential 20 to be transferred to the second front axle half shaft 28, thereby drivingly connecting the second front axle wheel assembly 40 to the front axle differential 20.

Additionally, when in the second position (not shown), the front axle system axle disconnect and differential locking system 98 is not engaged with the front axle differential 20. In this position, the front axle differential 20 is unlocked allowing a differential action to occur within the front axle differential 20 which allows the outer drive wheel(s) of the wheeled vehicle 2 to rotate at a faster rate than the inner drive wheel(s).

When the front axle system axle disconnect and differential locking system 98 is in a third position (not shown), the front axle system axle disconnect and differential locking system 98 is engaged with the second front axle differential output shaft 44. In this position, the second front axle differential output shaft 44 is drivingly connected to the second front axle half shaft 28. As previously discussed, this allows the rotational energy from the front axle differential 20 to be transferred to the second front axle half shaft 28, thereby drivingly connecting the second front axle wheel assembly 40 to the front axle differential 20.

Furthermore, when in the third position (not shown) the front axle system axle disconnect and differential locking system 98 engages the front axle differential 20. In this position, the front axle differential 20 is locked thereby preventing a differential action from occurring within the front axle differential 20. Locking the front axle differential 20 restricts the rotation of the wheels 32 and 40 to the same speed as if they were mounted on a common shaft, thereby allowing the vehicle 2 to experience an increase in traction.

As previously discussed, the vehicle 2 may include the use of the forward tandem axle system axle disconnect and differential locking system 100. The forward tandem axle system axle disconnect and differential locking system 100 selectively connects and disconnects the second forward tandem axle half shaft 56 with the second forward tandem axle differential output shaft 72. Additionally, the forward tandem axle system axle disconnect and differential locking system 100 illustrated in FIG. 1, selectively locks and unlocks the forward tandem axle differential 50. In order to do this, the forward tandem axle system axle disconnect and differential locking system 100 translates axially between three positions.

When the forward tandem axle system axle disconnect and differential locking system 100 is in a first position (not shown), the forward tandem axle system axle disconnect and differential locking system 100 is not engaged with the second forward tandem axle differential output shaft 56. In this position, the second forward tandem axle differential output shaft 72 is not drivingly connected to the second forward tandem axle half shaft 56 thereby preventing the rotational energy from the forward tandem axle differential 50 to be transferred to the second forward tandem axle half shaft 56. As a result, the second forward tandem axle wheel assembly 68 is disconnected from driving engagement with the with the forward axle differential 50.

In addition, when the forward tandem axle disconnect and differential locking system 100 is in the first position (not shown), the forward tandem axle system axle disconnect and differential locking system 100 is not engaged with the forward tandem axle differential 50. In this position, the forward tandem axle differential 50 is unlocked allowing a differential action to occur within the forward tandem axle differential 50 which allows the outer drive wheel(s) of the wheeled vehicle 2 to rotate at a faster rate than the inner drive wheel(s).

According to this embodiment, when the forward tandem axle system axle disconnect and differential locking system 100 is in a second position (not shown), the forward tandem axle system axle disconnect and differential locking system 100 is engaged with the second forward tandem axle differential output shaft 72. In this position, the second forward tandem axle output shaft 72 is drivingly connected to the with the second forward tandem axle half shaft 56. This allows the rotational energy from the forward tandem axle differential 50 to be transferred to the second forward tandem axle half shaft 56, thereby drivingly connecting the second forward tandem axle wheel assembly 68 to the forward tandem axle differential 50.

Additionally, when in the second position (not shown), the forward tandem axle system axle disconnect and differential locking system 100 is not engaged with the forward tandem axle differential 50. In this position, the forward tandem axle differential 50 is unlocked allowing a differential action to occur within the forward tandem axle differential 50 which allows the outer drive wheel(s) of the wheeled vehicle 2 to rotate at a faster rate than the inner drive wheel(s).

When the forward tandem axle system axle disconnect and differential locking system 100 is in a third position (not shown), the axle disconnect and differential locking system 100 is engaged with the second forward tandem axle differential output shaft 72. In this position, the second forward tandem axle differential output shaft 72 is drivingly connected with the second forward tandem axle half shaft 56. As previously discussed, this allows the rotational energy from the forward tandem axle differential 50 to be transferred to the second forward tandem axle half shaft 56, thereby drivingly connecting the second forward tandem axle wheel assembly 68 to the forward tandem axle differential 50.

Furthermore, when in the third position (not shown) the forward tandem axle system axle disconnect and differential locking system 100 engages the forward tandem axle differential 50. In this position, the forward tandem axle differential 50 is locked thereby preventing a differential action from occurring within the forward tandem axle differential 50. Locking the forward tandem axle differential 50 restricts the rotation of the wheels 60 and 68 to the same speed as if they were mounted on a common shaft, thereby allowing the vehicle 2 to experience an increase in traction.

According to yet another embodiment, the vehicle 2 may further include a rear tandem axle system axle disconnect and differential locking system 102. The rear tandem axle system axle disconnect and differential locking system 102 selectively connects and disconnects the second rear tandem axle half shaft 80 with the second rear tandem axle differential output shaft 96. Additionally, the rear tandem axle system axle disconnect and differential locking system 102 illustrated in FIG. 1, selectively locks and unlocks the rear tandem axle differential 74. In order to do this, the forward tandem axle system axle disconnect and differential locking system 102 translates axially between three positions.

When the rear tandem axle system axle disconnect and differential locking system 102 is in a first position (not shown), the rear tandem axle system axle disconnect and differential locking system 102 is not engaged with the second rear tandem axle differential output shaft 96. In this position, the second rear tandem axle differential output shaft 96 is not drivingly connected to the second rear tandem axle half shaft 80 thereby preventing the rotational energy from the rear tandem axle differential 74 to be transferred to the second rear tandem axle half shaft 80. As a result, the second rear tandem axle wheel assembly 92 is disconnected from driving engagement with the rear tandem axle differential 74.

In addition, when the rear tandem axle system axle disconnect and differential locking system 102 is in the first position (not shown), the rear tandem axle system axle disconnect and differential locking system 102 is not engaged with the rear tandem axle differential 74. In this position, the rear tandem axle differential 74 is unlocked allowing a differential action to occur within the rear tandem axle differential 74 which allows the outer drive wheel(s) of the wheeled vehicle 2 to rotate at a faster rate than the inner drive wheel(s).

According to this embodiment, when the rear tandem axle system axle disconnect and differential locking system 102 is in a second portion (not shown), the rear tandem axle system axle disconnect and differential locking system 102 is engaged with the second rear tandem axle differential output shaft 96. In this position, the second rear tandem axle differential output shaft 96 is drivingly connected to the second rear tandem axle half shaft 80. This allows the rotational energy from the rear tandem axle differential 74 to be transferred to the second rear tandem axle half shaft 80, thereby drivingly connecting the second rear tandem axle wheel assembly 92 with the rear tandem axle differential 74.

Additionally, when in the second position (not shown), the rear tandem axle system axle disconnect and differential locking system 102 is not engaged with the rear tandem axle differential 74. In this position, the rear tandem axle differential 74 is unlocked allowing a differential action to occur within the rear tandem axle differential 74 which allows the outer drive wheel(s) of the wheeled vehicle 2 to rotate at a faster rate than the inner drive wheel(s).

When the rear tandem axle system axle disconnect and differential locking system 102 is in a third position (not shown), the rear tandem axle system axle disconnect and differential locking system 102 is engaged with the second rear tandem axle differential output shaft 96. In this position, the second rear tandem axle differential output shaft 96 is drivingly connected with the second rear tandem axle half shaft 80. As previously discussed, this allows the rotational energy from the rear tandem axle differential 74 to be transferred to the second rear tandem axle half shaft 80, thereby drivingly connecting the second rear tandem axle wheel assembly 92 to the rear tandem axle differential 74.

Furthermore, when in the third position (not shown) the rear tandem axle system axle disconnect and differential locking system 102 engages the rear tandem axle differential 74. In the third position (not shown), the rear tandem axle differential 74 is locked thereby preventing a differential action from occurring within the rear tandem axle differential 74. Locking the rear tandem axle differential 74 restricts the rotation of the wheels 84 and 92 to the same speed as if they were mounted on a common shaft, thereby allowing the vehicle 2 to experience an increase in traction.

Figure 2:
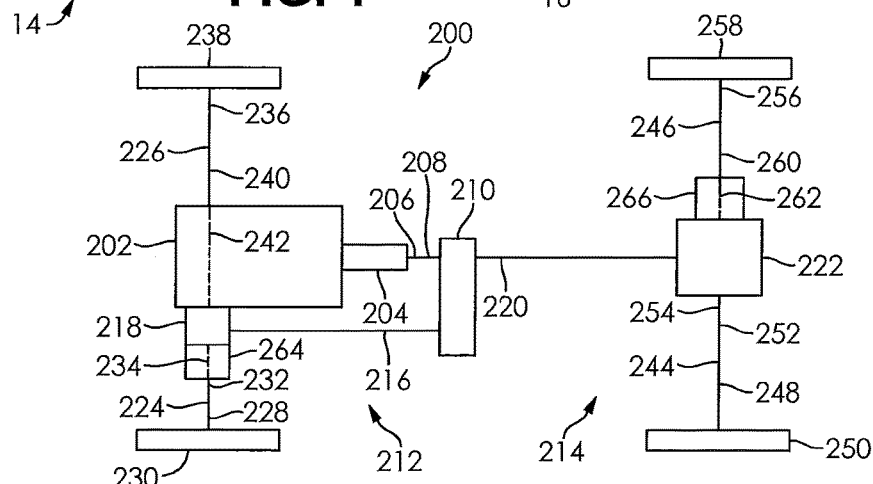
FIG. 2 is a schematic top-plan view of a vehicle having an axle disconnect and differential locking system according to another embodiment of the disclosure.

FIG. 2 is a schematic top-plan view of a vehicle having an axle disconnect and differential locking system according to another embodiment of the disclosure. The vehicle 200 has an engine 202 which is drivingly connected to a transmission 204. A transmission output shaft 206 is then drivingly connected to an end of the transmission 204 opposite the engine 202. As previously discussed, the transmission 204 is a power management system which provides controlled application of the rotational energy generated by the engine 202 by means of a gearbox.

The transmission output shaft 206 is drivingly connected to a transfer case input shaft 208 which in turn is drivingly connected to a transfer case 210. The transfer case 210 is used in four-wheel drive and all-wheel-drive (AWD) vehicles to transfer the rotational power from the transmission 204 to a front axle system 212 and a rear axle system 214 by utilizing a series of gears and drive shafts. The transfer case 210 additionally allows the vehicle 200 to selectively operate in either a two-wheel drive mode of a four-wheel/AWD mode.

A first transfer case output shaft 216 is drivingly connected to a forward axle differential 218 of a forward axle system 212 and a second transfer case output shaft 220 is drivingly connected to a rear axle differential 222 of a rear axle system 214. The forward axle differential 218 is a set of gears that allows the outer drive wheel(s) of a wheeled vehicle 200 to rotate at a faster rate than the inner drive wheel(s). The rotational power is transmitted through the forward axle system 212 as described in more detail below.

The forward axle system 212 further includes a first forward axle half shaft 224 and a second forward axle half shaft 226. The first forward axle half shaft 224 extends substantially perpendicular to the first transfer case output shaft 216. A first end 228 of the first forward axle half shaft 224 is drivingly connected to a first forward axle wheel assembly 230 and a second end 232 of the first forward axle half shaft 224 is drivingly connected to an end of a first forward axle differential output shaft 234. In a non-limiting example, the first forward axle differential output shaft 234 is a separate shaft, a separate stub shaft, a separate coupling shaft, a shaft integrally formed as part of a first forward axle differential side gear, a stub shaft integrally formed as part of a first forward axle differential side gear and/or a coupling shaft integrally formed as part of a first forward axle differential side gear. The first forward axle differential output shaft extends co-axially with the first forward axle half shaft 234. An end of the first forward axle differential output shaft 234 opposite the first forward axle half shaft 224, is drivingly connected to a side of the forward axle differential 218.

Extending substantially perpendicular with the first transfer case output shaft 216 is the second forward axle half shaft 226. Similarly, a first end of the second forward axle half shaft 236 is drivingly connected to a second forward axle wheel assembly 238 and a second end 240 of the second forward axle half shaft 226 is drivingly connected to an end of a second forward axle differential output shaft 242. In a non-limiting example, the second forward axle differential output shaft 242 is a separate shaft, a separate stub shaft, a separate coupling shaft, a shaft integrally formed as part of a second forward axle differential side gear, a stub shaft integrally formed as part of a second forward axle differential side gear and/or a coupling shaft integrally formed as part of a second forward axle differential side gear. The second forward axle differential output shaft 242 extends co-axially with the second forward axle half shaft 226. An end of the second forward axle differential output shaft 242 opposite the second forward axle half shaft 226, is drivingly connected to a side of the forward axle differential 218 opposite the first forward axle differential output shaft 234.

The second transfer case output shaft 220 may be connected to the rear axle differential 222 of the rear axle system 214 by means of a propeller shaft (not shown), a drive shaft (not shown), a rear axle input shaft (not shown), a rear axle differential pinion shaft, a stub shaft, a coupling shaft and/or a rear axle differential input shaft (not shown). The rear axle differential 222 is a set of gears that allows the outer drive wheel(s) of a wheeled vehicle 200 to rotate at a faster rate than the inner drive wheel(s). The rotational power is transmitted through the rear axle system 214 as described in more detail below.

The rear axle system 214 further includes a first rear axle half shaft 244 and a second rear axle half shaft 246. The first rear axle half shaft 244 extends substantially perpendicular to the second transfer case output shaft 220. A first end 248 of the rear axle half shaft 244 is drivingly connected to a first rear axle wheel assembly 250 and a second end 252 of the first rear axle half shaft 244 is drivingly connected to a first rear axle differential output shaft 254. In a non-limiting example, the first rear axle differential output shaft 254 is a separate shaft, a separate stub shaft, a separate coupling shaft, a shaft integrally formed as part of a first rear axle differential side gear, a stub shaft integrally formed as part of a first rear axle differential side gear and/or a coupling shaft integrally formed as part of a first rear axle differential side gear. The first rear axle differential output shaft 254 extends co-axially with the first rear axle half shaft 244. An end of the first rear axle differential output shaft 254 opposite the first rear axle half shaft 244 is drivingly connected to a side of the rear axle differential 222.

Extending substantially perpendicular to the second transfer case output shaft 220 is a second rear axle half shaft 246. A first end 256 of the second rear axle half shaft 246 is drivingly connected to a second rear axle wheel assembly 258 and a second end 260 of the second rear axle half shaft 246 is drivingly connected to an end of a second rear axle differential output shaft 262. In a non-limiting example, the second rear axle differential output shaft 262 is a separate shaft, a separate stub shaft, a separate coupling shaft, a shaft integrally formed as part of a second rear axle differential side gear, a stub shaft integrally formed as part of a second rear axle differential side gear and/or a coupling shaft integrally formed as part of a second rear axle differential side gear. The second rear axle differential output shaft 262 extends co-axially with the second rear axle half shaft 246. An end of the second rear axle differential output shaft 262 opposite the second rear axle half shaft 246 is drivingly connected to a side of the rear axle differential 222 opposite the first rear axle differential output shaft 254.

As it can be seen by referencing FIG. 2, the vehicle 200 may further include a forward axle system axle disconnect and differential locking system 264 and/or a rear axle system axle disconnect and differential locking system 266.

The forward axle system axle disconnect and differential locking system 264 selectively connects and disconnects the first forward axle half shaft 224 with the first forward axle differential output shaft 234. Additionally, the forward axle system axle disconnect and differential locking system 264 illustrated in FIG. 2, selectively locks and unlocks the forward axle differential 218. In order to selectively connect and disconnect the first forward axle half shaft 224 with the first forward axle differential output shaft 234 and to selectively lock and unlock the forward axle differential 218, the forward axle system axle disconnect and differential locking system 264 translates axially between three positions.

When the forward axle system axle disconnect and differential locking system 264 is in a first position (not shown), the forward axle system axle disconnect and differential locking system 264 is not engaged with the first forward axle differential output shaft 234. In this position, the first forward axle differential output shaft 234 is not drivingly connected to the first forward axle half shaft 224 thereby preventing the rotational energy from the forward axle differential 218 to be transferred to the first front axle half shaft 224. As a result, the first front axle wheel assembly 230 is disconnected from driving engagement with the front axle differential 218.

In addition, when in the first position (not shown), the forward axle system axle disconnect and differential locking system 264 is not engaged with the forward axle differential 218. In this position, the forward axle differential 218 is unlocked allowing a differential action to occur within the forward axle differential 218 which allows the outer drive wheel(s) of the wheeled vehicle 200 to rotate at a faster rate than the inner drive wheel(s).

According to this embodiment, when the forward axle system axle disconnect and differential locking system 264 is in a second position (not shown), the forward axle system axle disconnect and differential locking system 264 is engaged with the first forward axle differential output shaft 234. In this position, the first forward axle half shaft 224 is drivingly connected to the first forward axle differential output shaft 234. This allows the rotational energy from the forward axle differential 218 to be transferred to the first forward axle half shaft 224, thereby drivingly connecting the first forward axle wheel assembly 230 to the forward axle differential 218.

Additionally, when in the second position (not shown), the forward axle system axle disconnect and differential locking system 264 is not engaged with the forward axle differential 218. In this position, the forward axle differential 218 is unlocked allowing a differential action to occur within the forward axle differential 218 which allows the outer drive wheel(s) of the wheeled vehicle 200 to rotate at a faster rate than the inner drive wheel(s).

When the forward axle system axle disconnect and differential locking system 264 is in a third position (not shown), the forward axle system axle disconnect and differential locking system 264 is engaged with the first front axle differential output shaft 234. In this position, the first forward axle half shaft 224 is drivingly connected to the first forward axle differential output shaft 234. This allows the rotational energy from the forward axle differential 218 to be transferred to the first forward axle half shaft 224. As previously discussed, this allows the rotational energy from the forward axle differential 218 to be transferred to the first forward axle half shaft 224, thereby drivingly connecting the first forward axle wheel assembly 230 to the forward axle differential 218.

Furthermore, when in the third position (not shown) the forward axle system axle disconnect and differential locking system 264 engages the forward axle differential 218. In this position, the forward axle differential 218 is locked thereby preventing a differential action from occurring within the forward axle differential 218. Locking the forward axle differential 218 restricts the rotation of the wheels 230 and 238 to the same speed as if they were mounted on a common shaft, thereby allowing the vehicle 200 to experience an increase in traction.

As previously discussed, the vehicle 200 may include the use of a rear axle system axle disconnect and differential locking system 266. The rear axle system axle disconnect and differential locking system 266 selectively connects and disconnects the second rear axle half shaft 246 with the second rear axle differential output shaft 262. Additionally, the rear axle system axle disconnect and differential locking system 266 illustrated in FIG. 2, selectively locks and unlocks the rear axle differential 222. In order to do this, the rear axle system axle disconnect and differential locking system 266 translates axially between three positions.

When the rear axle system axle disconnect and differential locking system 266 is in a first position (not shown), the rear axle system axle disconnect and differential locking system 266 is not engaged with the second rear axle differential output shaft 262. In this position, the second rear axle differential output shaft 262 is not drivingly connected to a second rear axle half shaft 246 thereby preventing the rotational energy from the rear axle differential 222 to be transferred to the second rear axle half shaft 246. As a result, the second rear axle wheel assembly 258 is disconnected from driving engagement with the rear axle differential 222.

In addition, when in the first position (not shown), the rear axle system axle disconnect and differential locking device 266 is not engaged with the rear axle differential 222. In this position, the rear axle differential 222 is unlocked allowing a differential action to occur within the rear axle differential 222 which allows the outer drive wheel(s) of the wheeled vehicle 200 to rotate at a faster rate than the inner drive wheel(s).

According to this embodiment, when the rear axle system axle disconnect and differential locking system 266 is in a second position (not shown), the rear axle system axle disconnect and differential locking system 266 is engaged with the second rear axle differential output shaft 262. In this position, the second rear axle differential output shaft 262 is drivingly connected to the second rear axle half shaft 246. This allows the rotational energy from the rear axle differential 222 to be transferred to the second rear axle half shaft 246 thereby drivingly connecting the second rear axle wheel assembly 258 to the rear axle differential 222.

Additionally, when in the second position (not shown), the rear axle system axle disconnect and differential locking system 266 is not engaged with the rear axle differential 222. In this position, the rear axle differential 222 is unlocked allowing a differential action to occur within the rear axle differential 222 which allows the outer drive wheel(s) of the wheeled vehicle 200 to rotate at a faster rate than the inner drive wheel(s).

When the rear axle system axle disconnect and differential locking system 266 is in a third position (not shown), the rear axle system axle disconnect and differential locking system 266 is engaged with the second rear axle differential output shaft 262. In this position, the second rear axle differential output shaft 262 is drivingly connected to the second rear axle half shaft 246. As previously discussed, this allows the rotational energy from the rear axle differential 222 to be transferred to the second rear axle half shaft 246, thereby drivingly connecting the second rear axle wheel assembly 258 to the rear axle differential 222.

Furthermore, when in the third position (not shown) the front axle system axle disconnect and differential locking system 266 engages the front axle differential 222. In this position, the rear axle differential 222 is locked thereby preventing a differential action from occurring within the rear axle differential 222. Locking the rear axle differential 222 restricts the rotation of the wheels 250 and 258 to the same speed as if they were mounted on a common shaft, thereby allowing the vehicle 200 to experience an increase in traction.

Figure 3:
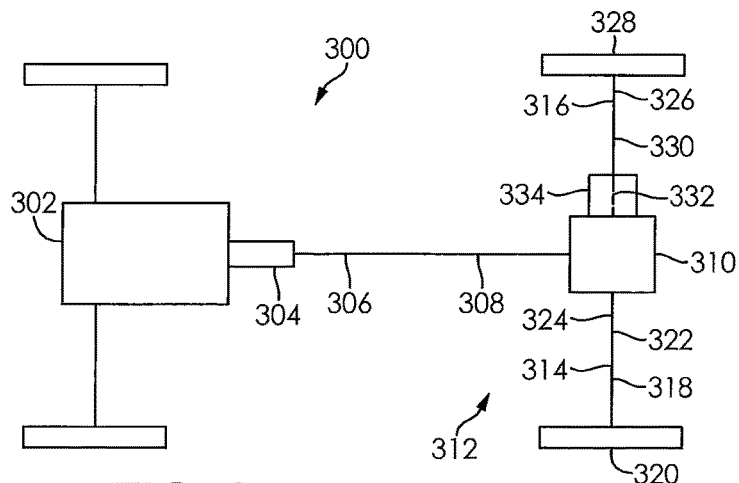
FIG. 3 is a schematic top-plan view of a vehicle having an axle disconnect and differential locking system according to yet another embodiment of the disclosure.

FIG. 3 is a schematic top-plan view of a vehicle having an axle disconnect and differential locking system according to yet another embodiment of the disclosure. The vehicle 300 has an engine 302 which is drivingly connected to a transmission 304. A transmission output shaft 306 is drivingly connected to an end of the transmission 304 opposite the engine 302. As previously discussed, the transmission 304 is a power management system which provides controlled application of the rotational power generated by the engine 302 by means of a gearbox.

The transmission output shaft 306 is drivingly connected to an end of a first propeller shaft 308. An end of the first propeller shaft 308 opposite the transmission output shaft 306 is drivingly connected to a differential 310 of a rear axle system 312. The differential 310 is a set of gears that allows the outer drive wheel(s) of a wheeled vehicle 300 to rotate at a faster rate than the inner drive wheel(s). The rotational power is transmitted through the rear axle system 312 as described in more detail below.

The rear axle system 312 further includes the use of a first rear axle half shaft 314 and a second rear axle half shaft 316. The first rear axle half shaft 314 extends substantially perpendicular to the first propeller shaft 308. A first end 318 of the first rear axle half shaft 314 is drivingly connected to a first rear axle wheel assembly 320 and a second end 322 of the first rear axle half shaft 314 is drivingly connected to an end of a first differential output shaft 324. In a non-limiting example, the first differential output shaft 324 is a separate shaft, a separate stub shaft, a separate coupling shaft, a shaft integrally formed as part of a first differential side gear, a stub shaft integrally formed as part of a first differential side gear and/or a coupling shaft integrally formed as part of a first differential side gear. The first differential output shaft 324 extends co-axially with the first rear axle half shaft 314. An end of the first differential output shaft 324 opposite the first rear axle half shaft 314 is drivingly connected to a side of the differential 310.

The second rear axle half shaft 316 also extends substantially perpendicular to the first propeller shaft 308. A first end 326 of the second rear axle half shaft 316 is drivingly connected to a second rear axle wheel assembly 328 and a second end 330 of the second rear axle half shaft 316 is drivingly connected to an end of a second differential output shaft 332. In a non-limiting example, the second differential output shaft 332 is a separate shaft, a separate stub shaft, a separate coupling shaft, a shaft integrally formed as part of a second differential side gear, a stub shaft integrally formed as part of a second differential side gear and/or a coupling shaft integrally formed as part of a second differential side gear. The second differential output shaft 332 extends co-axially with the second rear axle half shaft 316. An end of the second differential output shaft 332 opposite the second rear axle half shaft 316 is drivingly connected to a side of the differential 310 opposite the first differential output shaft 324.

As it can be seen by referencing FIG. 3, the vehicle 300 may further include a rear axle system axle disconnect and differential locking system 334. The rear axle system axle disconnect and differential locking system 334 selectively connects and disconnects the second rear axle half shaft 316 with the second differential output shaft 332. Additionally, the rear axle system axle disconnect and differential locking system 334 illustrated in FIG. 3, selectively locks and unlocks the differential 310. In order to selectively connect and disconnect the second rear axle half shaft 316 with the second rear axle differential output shaft 332 and to selectively lock and unlock the differential 310, the rear axle system axle disconnect and differential locking system 334 translates axially between three positions.

When the rear axle system axle disconnect and differential locking system 334 is in a first position (not shown), the rear axle system axle disconnect and differential locking system 334 is not engaged with the second differential output shaft 332. In this position, the second differential output shaft 332 is not drivingly connected to a second rear axle half shaft 316 thereby preventing the rotational energy from the differential 310 to be transferred to the second rear axle half shaft 316. As a result, the second rear axle wheel assembly 328 is disconnected from driving engagement with the differential 310.

In addition, when in the first position (not shown), the rear axle system axle disconnect and differential locking device 334 is not engaged with the differential 310. In this position, the differential 310 is unlocked allowing a differential action to occur within the differential 310 which allows the outer drive wheel(s) of the wheeled vehicle 300 to rotate at a faster rate than the inner drive wheel(s).

According to this embodiment, when the rear axle system axle disconnect and differential locking system 334 is in a second position (not shown), the rear axle system axle disconnect and differential locking system 334 is engaged with the second differential output shaft 332. In this position, the second differential output shaft 332 is drivingly connected to the second rear axle half shaft 316. This allows the rotational energy from the rear axle differential 310 to be transferred to the second rear axle half shaft 316 thereby drivingly connecting the second rear axle wheel assembly 328 to the differential 310.

Additionally, when in the second position (not shown), the rear axle system axle disconnect and differential locking system 334 is not engaged with the differential 310. In this position, the differential 310 is unlocked allowing a differential action to occur within the differential 310 which allows the outer drive wheel(s) of the wheeled vehicle 300 to rotate at a faster rate than the inner drive wheel(s).

When the rear axle system axle disconnect and differential locking system 334 is in a third position (not shown), the rear axle system axle disconnect and differential locking system 334 is engaged with the second differential output shaft 332. In this position, the second differential output shaft 332 is drivingly connected to the second rear axle half shaft 316. As previously discussed, this allows the rotational energy from the differential 310 to be transferred to the second rear axle half shaft 316, thereby drivingly connecting the second rear axle wheel assembly 328 to the differential 310.

Furthermore, when in the third position (not shown) the rear axle system axle disconnect and differential locking system 334 engages the differential 310. In this position, the differential 310 is locked thereby preventing a differential action from occurring within the differential 310. Locking the differential 310 restricts the rotation of the wheels 320 and 328 to the same speed as if they were mounted on a common shaft, thereby allowing the vehicle 300 to experience an increase in traction.

Figure 4:
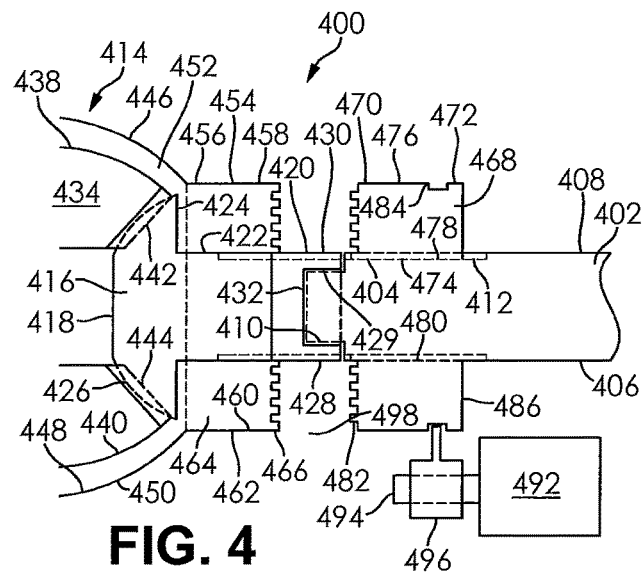
FIG. 4 is a schematic cut-away side view of an axle disconnect and differential locking system according to an embodiment wherein the axle disconnect and differential locking system is in a first position.
Figure 5:
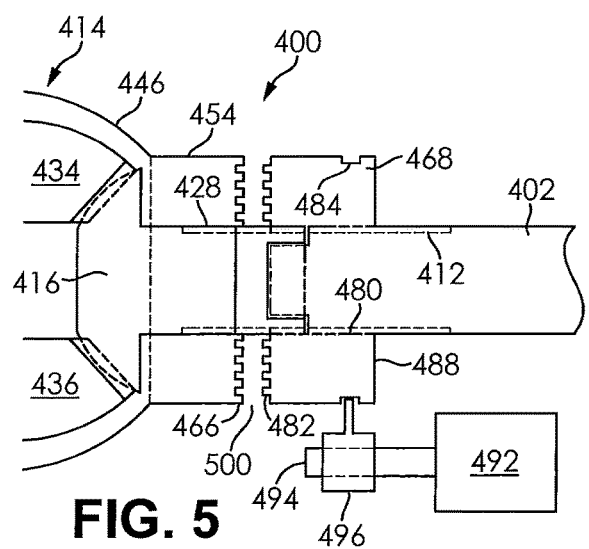
FIG. 5 is a schematic cut-away side view of the axle disconnect and differential locking system according to the embodiment illustrated in FIG. 4, wherein the axle disconnect and differential locking system is in a second position.
Figure 6:
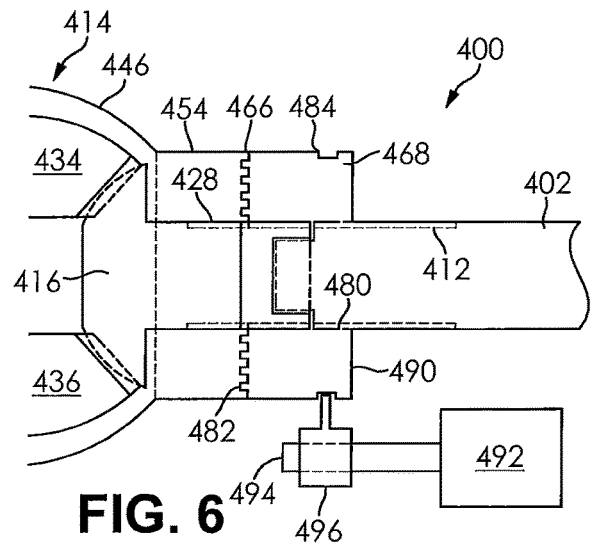
FIG. 6 is a schematic cut-away side view of the axle disconnect and differential locking system according to the embodiment illustrated in FIG. 4, wherein the axle disconnect and differential locking system is in a third position.

FIGS. 4, 5 and 6 of the present disclosure provide a schematic cut-away side-view of an axle disconnect and differential locking system according to an embodiment of the disclosure. The axle disconnect and differential locking system 400 includes an axle half shaft 402 having a first end portion 404, a second end 406, and an outer surface 408. In a non-limiting example, the axle half shaft 402 may be a front axle half shaft, a rear axle half shaft, a forward tandem axle half shaft or a rear tandem axle half shaft. The first end portion 404 of the axle half shaft 402 has a reduced diameter portion 410. Axially inboard from the reduced diameter portion 410 is a plurality of splines 412 circumferentially extending from at least a portion of the outer surface 408 of the axle half shaft 402.

A differential 414 with a differential side gear 416 having a first end portion 418, a second end portion 420 and an outer surface 422 extends co-axially with the axle half shaft 402. The first end portion 418 of the differential side gear 416 has an increased diameter portion 424 with a plurality of teeth 426 extending from the outer surface 422 of the increased diameter portion 424. Axially inboard from the increased diameter portion 424 is a plurality of splines 428 circumferentially extending from at least a portion of the outer surface 422 of the differential side gear 416.

As illustrated in FIGS. 4, 5 and 6, the second end portion 420 of the differential side gear 416 includes an inner surface 429 and an outer surface 430 defining a hollow portion 432 therein. At least a portion of the reduced diameter portion 410 on the first end portion 404 of the axle half shaft 402 is located within the hollow portion 432 in the second end portion 420 of the differential side gear 416. This provides a rotatable connection between the axle half shaft 402 to the differential side gear 416.

According to an alternative embodiment, the reduced diameter portion 410 on the first end portion 404 of the axle half shaft 402 is located in a bearing (not shown) within the hollow portion 432 in the second end portion 420 of the differential side gear 416. In a non-limiting example, the bearing (not shown) is a pilot bearing or any other type of bearing that will rotatively connect the axle half shaft 402 to the differential side gear 416.

According to yet another embodiment of the disclosure (not shown), the second end portion of the differential side gear has a reduced diameter portion (not shown) as opposed to the hollow portion 432 illustrated in FIGS. 4-6. In accordance with this embodiment (not shown), the first end portion of the axle half shaft has an inner surface and an outer surface defining a hollow portion (not shown) therein as opposed to the reduced diameter portion 410 illustrated in FIGS. 4-6. At least a portion of the reduced diameter portion (not shown) on the second end portion of the differential side gear is located within the hollow portion (not shown) in the first end portion of the axle half shaft. This provides a rotatable connection between the axle half shaft and the differential side gear.

According to still another embodiment (not shown), the reduced diameter portion (not shown) on the second end portion of the differential side gear is located in a bearing (not shown) within the hollow portion (not shown) in the first end portion of the axle half shaft. In a non-limiting example, the bearing (not shown) is a pilot bearing or any other type of bearing that will rotatively connect the axle half shaft to the differential side gear.

Axially outboard from the plurality of teeth 426 on the outer surface 422 of the increased diameter portion 424 of the differential side gear 416 is a pair of radially oriented spider gears 434 and 436 having an outer surface 438 and 440. Extending from at least a portion of the outer surface 438 and 440 of the pair of spider gears 434 and 436 is a plurality of teeth 442 and 444 that are complementary to and meshingly engaged with the plurality of teeth 426 on the increased diameter portion 424 of the differential side gear 416.

Extending co-axially with the axle half shaft 402 and radially outboard from the differential side gear 416 and the pair of spider gears 434 and 436 is a differential case 446 having an inner surface 448 and an outer surface 450. The inner surface 448 and the outer surface 450 of the differential case 446 defines a hollow portion 452 therein.

A substantially cylindrical body portion 454 extends co-axially with the axle half shaft 402 and axially outboard from the outer surface 450 of the differential case 446. The substantially cylindrical body portion 454 has a first end portion 456, a second end portion 458, an inner surface 460 and an outer surface 462. The inner surface 460 and the outer surface 462 of the substantially cylindrical body portion 454 defines a hollow portion 464 therein. Circumferentially extending axially outboard from the second end portion 458 of the substantially cylindrical body portion 454 is a plurality of clutch teeth 466. In a non-limiting example, the plurality of clutch teeth 466 on the second end potion 458 of the substantially cylindrical body portion 454 is a plurality of face clutch teeth, a plurality of dog clutch teeth or a friction clutch.

Disposed radially outboard from and extending co-axially with the axle half shaft 402 is a sliding collar 468 having a first end portion 470, a second end portion 472, an inner surface 474 and an outer surface 476. The inner surface 474 and the outer surface 476 of the sliding collar 468 defines a hollow portion 478 therein. Circumferentially extending from the inner surface 474 of the sliding collar 468 is a plurality of splines 480 that are complementary to and meshingly engaged with the plurality of splines 412 on the outer surface 408 of the axle half shaft 402.

Circumferentially extending axially outboard from the first end portion 470 of the sliding collar 468 is a plurality of clutch teeth 482. In a non-limiting example, the plurality of clutch teeth 482 on the first end portion 470 of the sliding collar 468 is a plurality of face clutch teeth, a plurality of dog clutch teeth or a friction clutch.

According to an alternative embodiment, the sliding collar 468 further includes a channel 484 that is co-axial with the axle half shaft 402 and extends circumferentially along the outer surface 476 of the sliding collar 468.

In order to transition the sliding collar 468 from a first position 486, to a second position 488 and a third position 490 an actuator 492 is used. The actuator 492 is disposed radially outboard from the sliding collar 468 and has an axis that is substantially parallel to the axle half shaft 402. In a non-limiting example, the actuator 402 is a piston, a pneumatic piston or a pneumatic actuator. The actuator 492 is drivingly connected to a shift shaft 494 which in turn is drivingly connected to an end of a shift fork 496. An end of the shift fork 496 opposite the shift shaft 494 is drivingly connected the outer surface 476 of the sliding collar 468.

According to an embodiment illustrated in FIGS. 4-6, where the outer surface 476 of the sliding collar 468 includes the channel 484, at least a portion of the end of the shift fork 496 opposite the shift shaft 494 extends into the channel 484. When in the channel 484 the sliding collar 468 will be able to freely rotate while the shift fork 496 remains in place.

FIG. 4 schematically illustrates the sliding collar 468 being in the first position 486. When in the first position 486, the plurality of splines 480 on the inner surface 474 of the sliding collar 468 are meshingly engaged with the plurality of splines 412 on the outer surface 408 of the axle half shaft 402 but are not meshingly engaged with the plurality of splines 428 on the outer surface 420 of the side gear 416. In this position, the axle half shaft 402 is disconnected from the differential side gear 416 thereby preventing the rotational energy from the differential side gear 416 to be transferred to the axle half shaft 402.

Additionally, when the sliding collar 468 is in the first position 486 illustrated in FIG. 4, the plurality of clutch teeth 482 on the first end portion 470 of the sliding collar 468 are not meshingly engaged with the plurality of clutch teeth 466 on the second end portion 458 of the substantially cylindrical body portion 454 defining a gap 498 therebetween. In this position, the differential 414 is unlocked allowing a differential action to occur within the differential 414 which allows the outer drive wheel(s) (not shown) of a wheeled vehicle (not shown) to rotate at a faster rate than the inner drive wheel(s) (not shown).

FIG. 5 schematically illustrates the sliding collar 468 being in the second position 488. In order to translate the sliding collar 468 axially to the second position 488, the actuator 492 extends axially outboard driving the shift fork 496 which in turn drives the sliding collar 468 from the first position 486 to the second position 488. When in the second position 488, the plurality of splines 480 on the inner surface 474 of the sliding collar 468 are meshingly engaged with the plurality of splines 412 on the outer surface 408 of the axle half shaft 402 and the plurality of splines 428 on the outer surface 420 of the side gear 416. In this position, the axle half shaft 402 is drivingly connected to the differential side gear 416 allowing the rotational energy from the differential side gear 416 to be transferred to the axle half shaft 402.

Additionally, when the sliding collar 468 is in the second position 488 illustrated in FIG. 5, the plurality of clutch teeth 482 on the first end portion 470 of the sliding collar 468 are not meshingly engaged with the plurality of clutch teeth 466 on the second end portion 458 of the substantially cylindrical body portion 454 defining a gap 500 therebetween. In this position, the differential 414 is unlocked allowing a differential action to occur within the differential 414 which allows the outer drive wheel(s) (not shown) of a wheeled vehicle (not shown) to rotate at a faster rate than the inner drive wheel(s) (not shown).

FIG. 6 schematically illustrates the sliding collar 468 being in the third position 490. In order to translate the sliding collar 468 axially to the third position 490, the actuator 492 extends axially outboard driving the shift fork 496 which in turn drives the sliding collar 468 from the second position 488 to the third position 490. When in the third position 490, the plurality of splines 480 on the inner surface 474 of the sliding collar 468 are meshingly engaged with the plurality of splines 412 on the outer surface 410 of the axle half shaft 402 and the plurality of splines 428 on the outer surface 420 of the side gear 416. In this position, the axle half shaft 402 is drivingly connected to the differential side gear 416 allowing the rotational energy from the differential side gear 416 to be transferred to the axle half shaft 402.

Additionally, when the sliding collar 468 is in the third position 490 illustrated in FIG. 6, the plurality of clutch teeth 482 on the first end portion 470 of the sliding collar 468 are meshingly engaged with the plurality of clutch teeth 466 on the second end portion 458 of the substantially cylindrical body portion 454. In this position, the differential 414 is locked thereby preventing a differential action from occurring within the differential 414. Locking the differential 414 restricts the rotation of the wheel(s) (not shown) to the same speed as if they were mounted on a common shaft, thereby allowing the vehicle (not shown) to experience an increase in traction.

In order to unlock the differential 414 and transition the axle disconnect and differential locking system 400 from the third position 490 illustrated in FIG. 6 to the second position 488 illustrated in FIG. 5, the actuator 492 axially retracts. When the actuator 492 retracts it moves the shift fork 496 which in turn drives the sliding collar 468 disengaging the sliding collar 468 from the substantially cylindrical body portion 454 of the differential case 446. As previously discussed, when in this position the plurality of clutch teeth 482 on the sliding collar 468 are not meshingly engaged with the plurality of clutch teeth 466 on the substantially cylindrical body portion 454.

In order to disconnect the axle half shaft 402 from the differential side gear 416 and transition the axle disconnect and differential locking system 400 from the second position 498 illustrated in FIG. 5 to the first position 486 illustrated in FIG. 4 the actuator 492 again axially retracts. When the actuator 492 retracts it moves the shift fork 496 which in turn drives the sliding collar 468 disengaging the sliding collar 468 from the differential side gear 416. As previously discussed, when in this position the plurality of splines 480 on the inner surface 474 of the sliding collar 476 are not meshingly engaged with the plurality of splines 428 on the outer surface 420 of the differential side gear 416.

Figure 7:
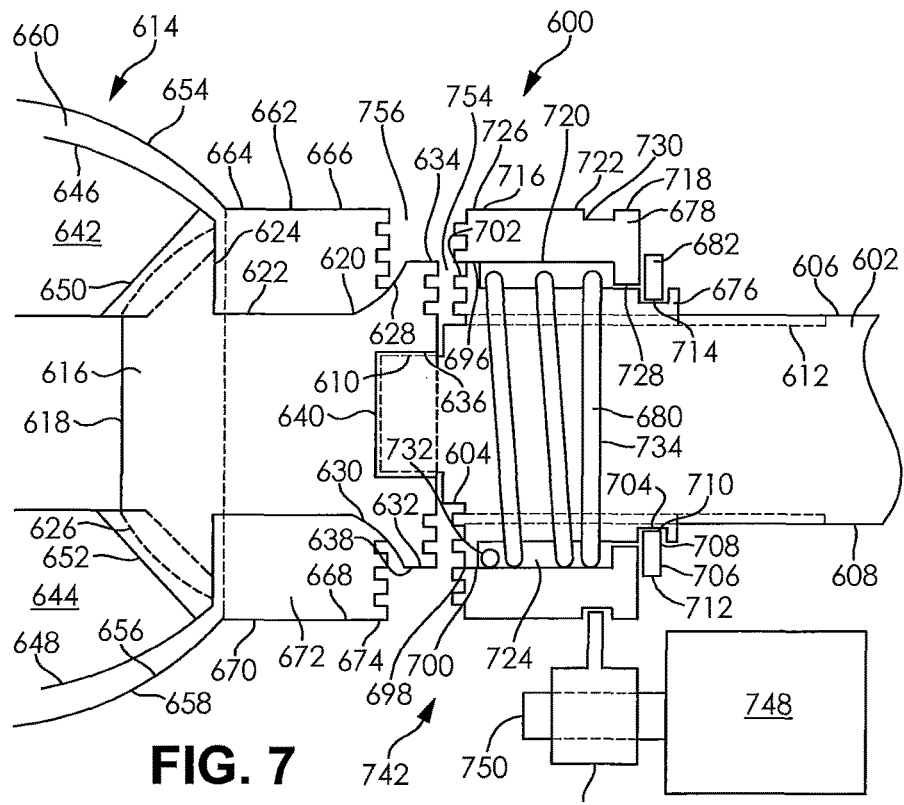
FIG. 7 is a schematic cut-away side view of an axle disconnect and differential locking system according to another embodiment, wherein the axle disconnect and differential locking system is in a first position.
Figure 8:
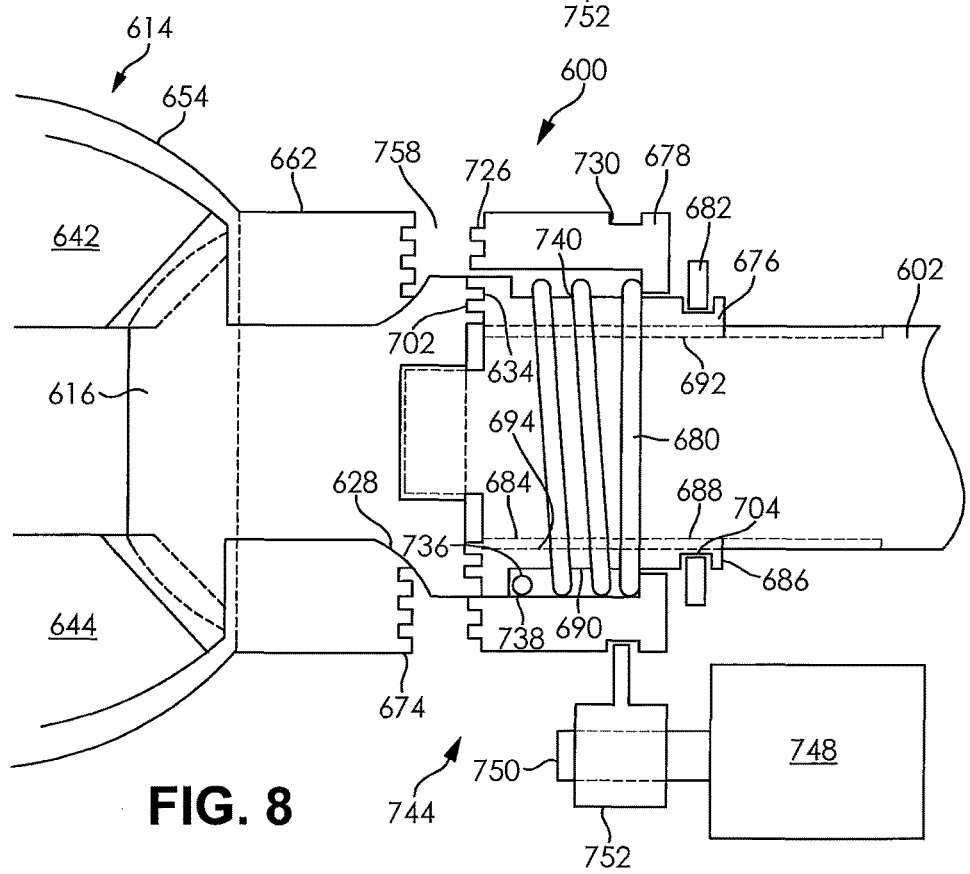
FIG. 8 is a schematic cut-away side view of the axle disconnect and differential locking system according to the embodiment illustrated in FIG. 7, wherein the axle disconnect and differential locking system is in a second position.
Figure 9:
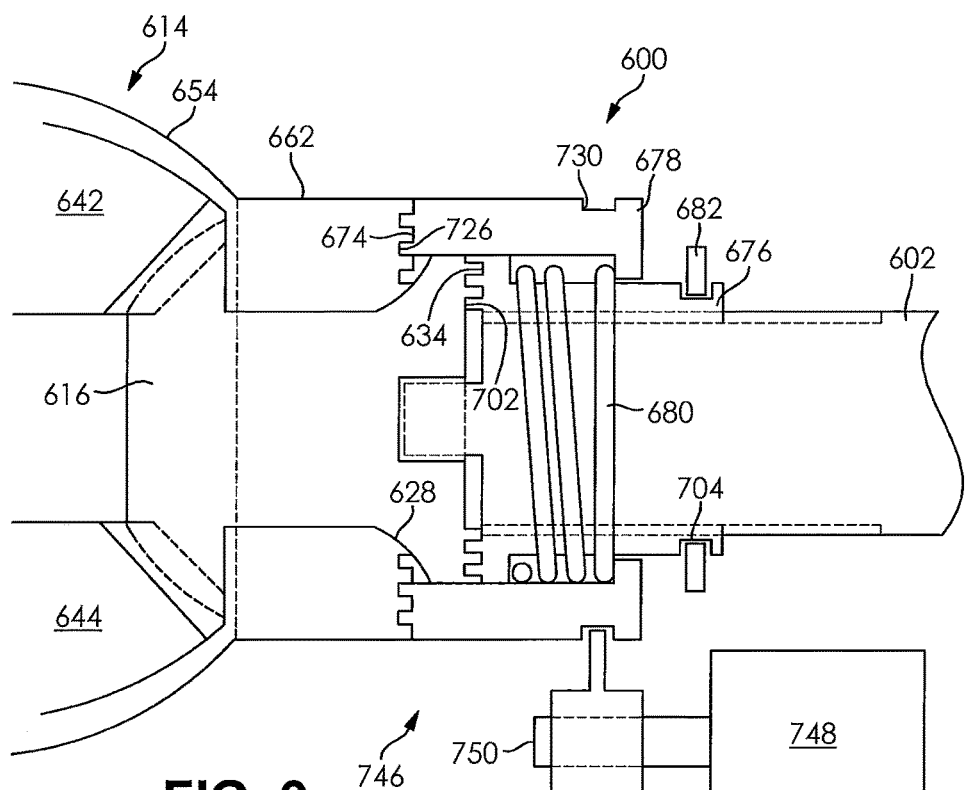
FIG. 9 is a schematic cut-away side view of the axle disconnect and differential locking system according to the embodiment illustrated in FIG. 7, wherein the axle disconnect and differential locking system is in a third position.

FIGS. 7, 8 and 9 of the present disclosure provide a schematic cut-away side-view of an axle disconnect and differential locking system 600 according to another embodiment of the disclosure. The axle disconnect and differential locking system 600 includes an axle half shaft 602 having a first end 604, a second end 606, and an outer surface 608. In a non-limiting example, the axle half shaft 602 may be a front axle half shaft, a rear axle half shaft, a forward tandem axle half shaft or a rear tandem axle half shaft. The first end portion 604 of the axle half shaft 604 has a reduced diameter portion 610. Axially inboard from the reduced diameter portion 610 is a plurality of splines 612 circumferentially extending from at least a portion of the outer surface 608 of the axle half shaft 602.

A differential 614 with a differential side gear 616 having a first end portion 618, a second end portion 620 and an outer surface 622 extends co-axially with the axle half shaft 602. The first end portion 618 of the differential side gear 616 has an increased diameter portion 624 with a plurality of teeth 626 extending from the outer surface 622 of the increased diameter portion 624.

As illustrated in FIGS. 7, 8 and 9, the second end portion 620 of the differential side gear 616 has an increased diameter portion 628 having a first end portion 630 and a second end portion 632. Extending circumferentially and axially outboard from the second end portion 632 of the increased diameter portion 628 on the second end portion 620 of the differential side gear 616 is a plurality of clutch teeth 634. In a non-limiting example, the plurality of clutch teeth 634 on the second end portion 632 of the increased diameter portion 628 is a plurality of face clutch teeth, a plurality of dog clutch teeth or a friction clutch.

According to an alternative embodiment (not shown), the second end portion of the differential side gear does not include the increased diameter portion 628 illustrated in FIGS. 7-9. In accordance with this embodiment, a plurality of clutch teeth (not shown) extend circumferentially and axially outboard from the second end portion of the differential side gear. In a non-limiting example, the plurality of clutch teeth (not shown) on the second end portion of the differential side gear is a plurality of face clutch teeth, a plurality of dog clutch teeth or a friction clutch.

As it can be seen by referencing FIGS. 7-9, the second end portion 620 of the differential side gear 616 also includes an inner surface 636 and an outer surface 638 defining a hollow portion 640 therein. At least a portion of the reduced diameter portion 610 on the first end portion 604 of the axle half shaft 602 is located within the hollow portion 640 in the second end portion 620 of the differential side gear 616. This provides a rotatable connection between the axle half shaft 602 to the differential side gear 616.

According to an alternative embodiment (not shown), the reduced diameter portion 610 on the first end portion 604 of the axle half shaft 602 is located in a bearing (not shown) within the hollow portion 640 in the second end portion 620 of the differential side gear 616. In a non-limiting example, the bearing (not shown) within the hollow portion 640 of the second end portion 620 of the differential side gear 616 is a pilot bearing or any other type of bearing that will rotatively connect the axle half shaft 602 to the differential side gear 616.

According to yet another embodiment of the disclosure (not shown), the second end portion of the differential side gear has a reduced diameter portion (not shown) as opposed to the hollow portion 640 illustrated in FIGS. 7-9. In accordance with this embodiment (not shown), the first end portion of the axle half shaft has an inner surface and an outer surface defining a hollow portion (not shown) therein as opposed to the reduced diameter portion 610 illustrated in FIGS. 7-9. At least a portion of the reduced diameter portion (not shown) on the second end portion of the differential side gear is located within the hollow portion (not shown) in the first end portion of the axle half shaft. This provides a rotatable connection between the axle half shaft and the differential side gear.

According to still another embodiment (not shown), the reduced diameter portion (not shown) on the second end portion of the differential side gear is located in a bearing (not shown) within the hollow portion (not shown) in the first end portion of the axle half shaft. In a non-limiting example, the bearing (not shown) within the hollow portion (not shown) in the first end portion of the axle half shaft is a pilot bearing or any other type of bearing that will rotatively connect the axle half shaft to the differential side gear.

Axially outboard from the plurality of teeth 626 on the outer surface 622 of the increased diameter portion 624 of the differential side gear 616 is a pair of radially oriented spider gears 642 and 644 having an outer surface 646 and 648. Extending from at least a portion of the outer surface 646 and 648 of the pair of spider gears 642 and 644 is a plurality of teeth 650 and 652 that are complementary to and meshingly engaged with the plurality of teeth 626 on the increased diameter portion 624 of the first end portion 618 of the differential side gear 616.

Extending co-axially with the axle half shaft 602 and radially outboard from the differential side gear 616 and the pair of spider gears 642 and 644 is a differential case 654 having an inner surface 656 and an outer surface 658. The inner surface 656 and the outer surface 658 of the differential case 654 defines a hollow portion 660 therein.

A substantially cylindrical body portion 662 extends co-axially with the axle half shaft 602 and axially outboard from the outer surface 658 of the differential case 654. The substantially cylindrical body portion 662 has a first end portion 664, a second end portion 666, an inner surface 668 and an outer surface 670. The inner surface 668 and the outer surface 670 of the substantially cylindrical body portion 662 defines a hollow portion 672 therein. Circumferentially extending axially outboard from the second end portion 666 of the substantially cylindrical body portion 662 is a plurality of clutch teeth 674. In a non-limiting example, the plurality of clutch teeth 674 on the second end potion 666 of the substantially cylindrical body portion 662 is a plurality of face clutch teeth, a plurality of dog clutch teeth or a friction clutch.

Disposed radially outboard from the axle half shaft 602 is the axle disconnect and differential locking system 600 having an axle disconnect collar 676, a differential locking collar 678, a biasing member 680 and a snap ring 682. Located radially outboard from and extending co-axially with the axle half shaft 602 is the axle disconnect collar 676 having a first end portion 684, a second end portion 686, an inner surface 688 and an outer surface 690. The inner surface 688 and the outer surface 690 of the axle disconnect collar 676 defines a hollow portion 692 therein. Circumferentially extending from the inner surface 688 of the axle disconnect collar 676 is a plurality of splines 694 that are complementary to and meshingly engaged with the plurality of splines 612 on the outer surface 608 of the axle half shaft 602.

Extending from the outer surface 688 of the first end portion 684 of the axle disconnect collar 676 is an increased diameter portion 696 having a first end portion 698 and a second end portion 700. Circumferentially extending axially outboard from the first end portion 698 of the increased diameter portion 696 is a plurality of clutch teeth 702 that are complementary to the plurality of clutch teeth 634 on the increased diameter portion 628 on the second end portion 620 of the differential side gear 616. In a non-limiting example, the plurality of clutch teeth 702 on the increased diameter portion 696 is a plurality of face clutch teeth, a plurality of dog clutch teeth or a friction clutch.

The axle disconnect collar 676 further includes a channel 704 that is co-axial with the axle half shaft 602 and extends circumferentially along at least a portion of the outer surface 688 of the axle disconnect collar 676.

Disposed radially outboard from the channel 704 on the second end portion 686 of the axle disconnect collar 676 and co-axial with the axle half shaft 602 is the snap ring 682 having a top portion 706, a bottom portion 708, an inner surface 710 and an outer surface 712. The inner surface 710 and the outer surface 712 of the snap ring 682 defines a hollow portion 714 therein. At least a portion, of the bottom portion 708, of the snap ring 682 is disposed within the channel 704 on the second end portion 686 of the axle disconnect collar 676.

According to an alternative embodiment of the disclosure (not shown), the second end portion of the axle disconnect collar has an increased diameter portion (not shown) extending from the outer surface of the second end portion of axle disconnect collar as opposed to the channel 704 and the snap ring 682.

Disposed radially outboard from the axle disconnect collar 676 and extending co-axially with the axle half shaft 602, is the differential locking collar 678 having a first end portion 716, a second end portion 718, an inner surface 720 and an outer surface 722. The inner surface 720 and the outer surface 722 of the differential locking collar 678 defines a hollow portion 724 therein.

Circumferentially extending axially outboard from the first end portion 716 of the differential locking collar 678 is a plurality of clutch teeth 726 that are complementary to the plurality of clutch teeth 674 on the second end portion 666 of the substantially cylindrical body portion 662. In a non-limiting example, the plurality of clutch teeth 726 on the first end portion 716 of the differential locking collar 678 is a plurality of face clutch teeth, a plurality of dog clutch teeth or a friction clutch.

As illustrated in FIGS. 7-9, the differential locking collar 678 further includes a protruding portion 728 that extends radially inboard from the inner surface 720 of the second end portion 718 of the differential locking collar 678 toward the axle disconnect collar 676. The protruding portion 728 on the inner surface 720 of the second end portion 718 of the differential locking collar 678 is disposed axially inboard from the snap ring 682 or the increased diameter portion (not shown) on the second end portion 686 of the axle disconnect collar 676.

According to an alternative embodiment, the differential locking collar 678 further includes a channel 730 that is co-axial with the axle half shaft 602 and extends circumferentially along the outer surface 722 of the differential locking collar 678.

Disposed between the outer surface 688 of the axle disconnect collar 676 and the inner surface 720 of the differential locking collar 678 is the biasing member 680 having a first end portion 732, a second end portion 734, an inner surface 736 and an outer surface 738. The inner surface 736 and the outer surface 738 of the biasing member 680 defines a hollow portion 740 therein. Axially inboard from the plurality of clutch teeth 702 on the first end portion 684 of the axle disconnect collar 676 is the first end portion 732 of the biasing member 680 and axially inboard from the protruding portion 728 is the second end portion 734 of the biasing member 680. In a non-limiting example, the biasing member 680 is a spring or any other device that can be compressed and/or pulled but will return to its former shape when released.

In order to transition the axle disconnect and differential locking system 600 from a first position 742, to a second position 744 and a third position 746 an actuator 748 is used. The actuator 748 is disposed radially outboard from the axle disconnect and differential locking system 600 and has an axis that is substantially parallel to the axle half shaft 602. In a non-limiting example, the actuator 748 is a piston, a pneumatic piston or a pneumatic actuator. The actuator 748 is drivingly connected to a shift shaft 750 which in turn is drivingly connected to an end of a shift fork 752. An end of the shift fork 752 opposite the shift shaft 750 is then drivingly connected the outer surface 722 of the differential locking collar 678.

According to an embodiment illustrated in FIGS. 7-9, where the outer surface 722 of the differential locking collar 678 includes the channel 730, at least a portion of the end of the shift fork 752 opposite the shift shaft 750 extends into the channel 730. When in the channel 730 the differential locking collar 678 will be able to freely rotate while the shift fork 752 remains in place.

FIG. 7 schematically illustrates the axle disconnect and differential locking system 600 being in the position 742. When in the first position 742, the plurality of clutch teeth 702 on the first end portion 684 of the increased diameter portion 696 of the axle disconnect collar 676 are not meshingly engaged with the plurality of clutch teeth 634 on the second end portion 620 of the differential side gear 616 defining a gap 754 therebetween. In this position, the axle half shaft 602 is disconnected from the differential side gear 616 thereby preventing the rotational energy from the differential side gear 616 to be transferred to the axle half shaft 602.

Additionally, when the axle disconnect and differential locking system 600 is in the first position 742 illustrated in FIG. 7, the plurality of clutch teeth 726 on the first end portion 716 of the differential locking collar 678 are not meshingly engaged with the plurality of clutch teeth 674 on the second end portion 666 of the substantially cylindrical body portion 662 defining a gap 756 therebetween. In this position, the differential 614 is unlocked allowing a differential action to occur within the differential 614 which allows the outer drive wheel(s) (not shown) of a wheeled vehicle (not shown) to rotate at a faster rate than the inner drive wheel(s) (not shown).

FIG. 8 schematically illustrates the axle disconnect and differential locking system 600 being in the second position 744. In order to translate the axle disconnect and differential locking system 600 axially to the second position 744, the actuator 748 extends axially outboard driving the shift fork 752 which in turn drives the differential locking collar 678 and compresses the biasing member 680 loading it with energy. The energy loaded in the biasing member 680 provides the force necessary to translate the axle disconnect collar 676 axially engaging the plurality of clutch teeth 702 on the axle disconnect collar 676 with the plurality of clutch teeth 634 on the second end portion 620 of the differential side gear 616. Additionally, the biasing member 680 allows for full travel of the actuator 748 regardless of the clutch state even if the plurality of clutch teeth 634 and 702 are blocked. Once the plurality of clutch teeth 634 and 702 are unblocked, the energy stored in the biasing member 680 will force the axle disconnect collar 676 to translate axially and meshingly engage the plurality of clutch teeth 702 on the axle disconnect collar 676 with the plurality of clutch teeth 634 on the second end portion 620 of the differential side gear 616. In this position, the axle half shaft 602 is connected to the differential side gear 616 thereby allowing the rotational energy from the differential side gear 616 to be transferred to the axle half shaft 602.

Additionally, when in the second position 744 illustrated in FIG. 8, the plurality of clutch teeth 726 on the first end portion 716 of the differential locking collar 678 are not meshingly engaged with the plurality of clutch teeth 674 on the second end portion 666 of the substantially cylindrical body portion 662 defining a gap 758 therebetween. In this position, the differential 614 is unlocked allowing a differential action to occur within the differential 614 which allows the outer drive wheel(s) (not shown) of a wheeled vehicle (not shown) to rotate at a faster rate than the inner drive wheel(s) (not shown).

FIG. 9 schematically illustrates the axle disconnect and differential locking system 600 being in the third position 746. In order to translate the axle disconnect and differential locking system 600 axially to the third position 746, the actuator 748 extends axially outboard driving the shift fork 752 which in turn drives the differential locking collar 678. As a result, the plurality of clutch teeth 726 on the differential locking collar 678 are meshingly engaged with the plurality of clutch teeth 674 on the substantially cylindrical body portion 622. In this position, the differential 614 is locked thereby preventing a differential action from occurring within the differential 614. Locking the differential 614 restricts the rotation of the wheel(s) (not shown) to the same speed as if they were mounted on a common shaft, thereby allowing the vehicle (not shown) to experience an increase in traction.

Furthermore, when the axle disconnect and differential locking system 600 is in the third position 746 illustrated in FIG. 9, the plurality of clutch teeth 702 on the axle disconnect collar 676 are meshingly engaged with the plurality of clutch teeth 634 on the second end portion 620 of the differential side gear 616. As previously discussed, in this position, the axle half shaft 602 is connected to the differential side gear 616 thereby allowing the rotational energy from the differential side gear 616 to be transferred to the axle half shaft 602.

In order to unlock the differential 614 and transition the axle disconnect and differential locking system 600 from the third position 746 illustrated in FIG. 9 to the second position 744 illustrated in FIG. 8 the actuator 748 axially retracts. When the actuator 748 retracts it moves the shift fork 752 which in turn drives the differential locking collar 678 and disengages the differential locking collar 678 from the substantially cylindrical body portion 662 of the differential case 654. As previously discussed, when in this position the plurality of clutch teeth 726 on the differential locking collar 678 are not meshingly engaged with the plurality of clutch teeth 674 on the substantially cylindrical body portion 662.

In order to disconnect the axle half shaft 602 from the differential side gear 616 and transition the axle disconnect and differential locking system 600 from the second position 744 illustrated in FIG. 8 to the first position 742 illustrated in FIG. 7, the actuator 748 again axially retracts. When the actuator 748 retracts it moves the shift fork 752 which in turn drives the differential locking collar 678 contacting the snap ring 682 or the increased diameter portion (not shown) on the second end portion 686 of the axle disconnect collar 676. Once the differential locking collar 678 contacts the snap ring 682 or the increased diameter portion (not shown) on the second end portion 686 of the axle disconnect collar 676, it drives the axle disconnect collar 676 and disconnects the axle disconnect collar 676 from the differential side gear 616. As previously discussed, when in this position the plurality of clutch teeth 702 on the axle disconnect collar 676 are not meshingly engaged with the plurality of clutch teeth 634 on the differential side gear 616.

Figure 10:
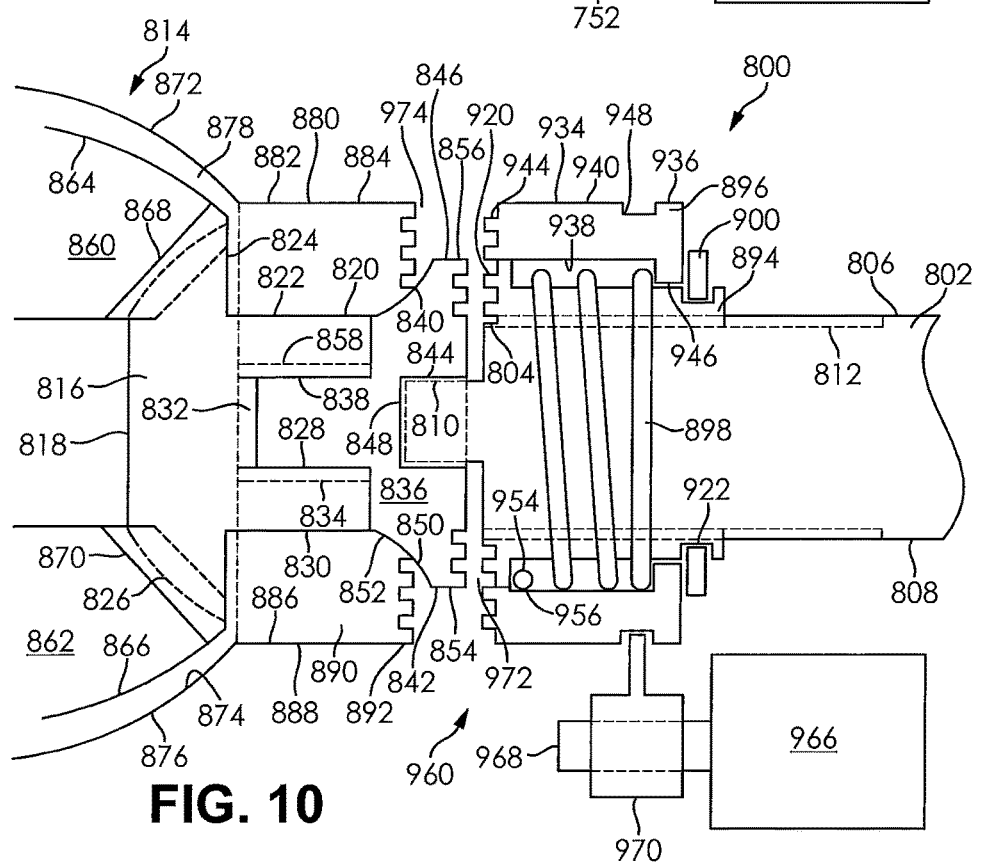
FIG. 10 is a schematic cut-away side view of an axle disconnect and differential locking system according to yet another embodiment, wherein the axle disconnect and differential locking system is in a first position.
Figure 11:
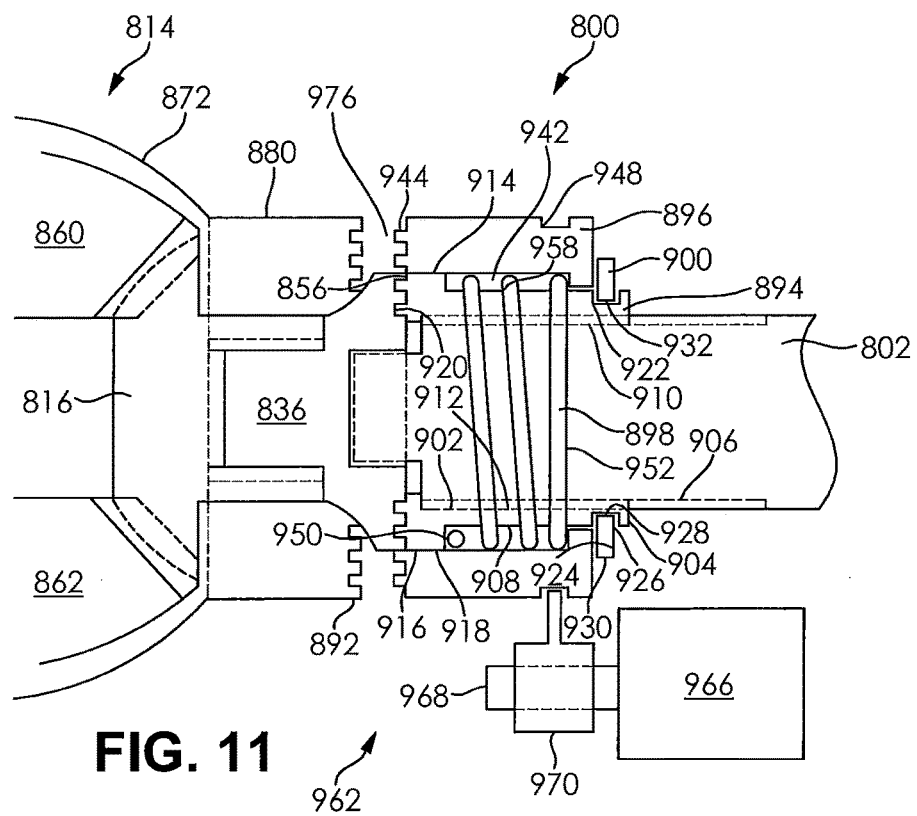
FIG. 11 is a schematic cut-away side view of an axle disconnect and differential locking system according to the embodiment illustrated in FIG. 10, wherein the axle disconnect and differential locking system is in a second position.
Figure 12:
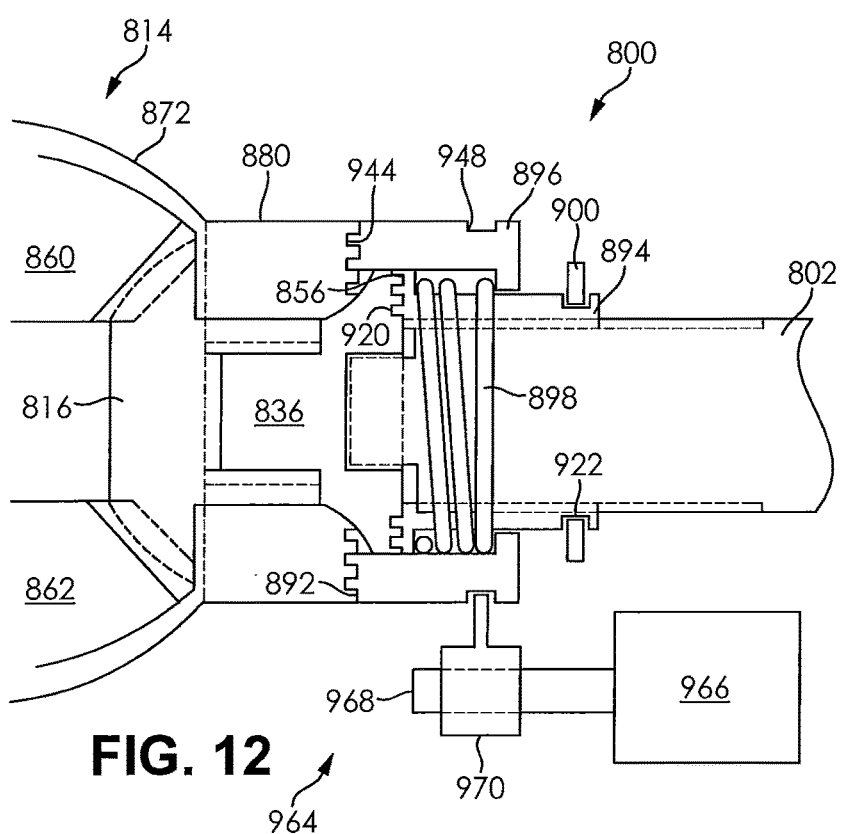
FIG. 12 is a schematic cut-away side view of an axle disconnect and differential locking system according to the embodiment illustrated in FIG. 10, wherein the axle disconnect and differential locking system is in a third position.

FIGS. 10, 11 and 12 of the present disclosure provide a schematic cut-away side-view of an axle disconnect and differential locking system according to yet another embodiment of the disclosure. The axle disconnect and differential locking system 800 includes an axle half shaft 802 having a first end 804, a second end 806 and an outer surface 808. In a non-limiting example, the axle half shaft 802 may be a front axle half shaft, a rear axle half shaft, a forward tandem axle half shaft or a rear tandem axle half shaft. The first end portion 804 of the axle half shaft 802 has a reduced diameter portion 810. Axially inboard from the reduced diameter portion 810 is a plurality of splines 812 circumferentially extending from at least a portion of the outer surface 808 of the axle half shaft 802.

A differential 814 with a differential side gear 816 having a first end portion 818, a second end portion 820 and an outer surface 822 extends co-axially with the axle half shaft 802. The first end portion 818 of the differential side gear 816 has an increased diameter portion 824 with a plurality of teeth 826 extending from the outer surface 822 of the increased diameter portion 824.

The second end portion 820 of the differential side gear 816 has an inner surface 828 and an outer surface 830 defining a hollow portion 832 therein. Circumferentially extending from the inner surface 828 on the second end portion 820 of the differential side gear 816 is a plurality of splines 834.

Extending co-axially with the axle half shaft 802 is a stub shaft 836 having a first end 838, a second end portion 840 and an outer surface 842. The second end portion 840 of the stub shaft 836 has an inner surface 844 and an outer surface 846 defining a hollow portion 848 therein. At least a portion of the reduced diameter portion 810 on the first end portion 804 of the axle half shaft 802 is located within the hollow portion 848 in the second end portion 840 of the stub shaft 836. This provides a rotatable connection between the stub shaft 836 and the axle half shaft 802.

According to an alternative embodiment (not shown), the reduced diameter portion 810 on the first end portion 804 of the axle half shaft 802 is located in a bearing (not shown) within the hollow portion 848 in the second end portion 840 of the stub shaft 836. In a non-limiting example, the bearing (not shown) within the hollow portion 848 of the second end portion 840 of the stub shaft 836 is a pilot bearing or any other type of bearing that will rotatively connect the axle half shaft 802 to the stub shaft 836.

Additionally, the second end portion 840 of the stub shaft 836 further includes an increased diameter portion 850 having a first end portion 852 and a second end portion 854. Circumferentially extending from the second end portion 854 of the increased diameter portion 850 of the stub shaft 836 is a plurality of clutch teeth 856. In a non-limiting example, the plurality of clutch teeth 856 on the increased diameter portion 850 of the stub shaft 836 is a plurality of face clutch teeth, a plurality of dog clutch teeth or a friction clutch.

Circumferentially extending from at least a portion of the outer surface 842 of the stub shaft 836 and axially inboard from the increased diameter portion 850 on the second end portion 840 of the stub shaft 836 is a plurality of splines 858. The plurality of splines 858 on the outer surface 842 of the stub shaft 836 are complementary to and meshingly engaged with the plurality of splines 834 on the second end portion 820 of the differential side gear 816. As a result, the differential side gear 816 is drivingly connected to the stub shaft 836.

According to an alternative embodiment (not shown), the first end portion of the axle half shaft has an inner surface and an outer surface defining a hollow portion (not shown) therein as opposed to the reduced diameter portion 810 illustrated in FIGS. 10-12. In accordance with this embodiment (not shown), the second end portion of the stub shaft has a reduced diameter portion (not shown) as opposed to the hollow portion 848 illustrated in FIGS. 10-12. At least a portion of the reduced diameter portion (not shown) on the second end portion of the stub shaft is located within the hollow portion (not shown) in the first end portion of the axle half shaft providing a rotatable connection between the stub shaft and the axle half shaft.

In accordance with this embodiment (not shown), the reduced diameter portion on the second end portion of the stub shaft is located within a bearing (not shown) within the hollow portion (not shown) in the first end portion of the axle half shaft. In a non-limiting example, the bearing (not shown) within the hollow portion (not shown) of the first end portion of the axle half shaft is a pilot bearing or any other type of bearing that will rotatively connect the axle half shaft to the stub shaft.

According to yet another embodiment (not shown), the first end portion of the stub shaft has an inner surface and an outer surface defining a hollow portion (not shown) therein. Circumferentially extending from the inner surface of the hollow portion (not shown) in the first end portion of the stub shaft is a plurality of splines (not shown). In accordance with this embodiment (not shown), at least a portion of the outer surface of the differential side gear is a plurality of splines (not shown). The plurality of splines on the outer surface of the differential side gear are complementary to and meshingly engaged with the plurality of splines (not shown) on the inner surface of the hollow portion (not shown) in the first end portion of the stub shaft. As a result, the differential side gear is drivingly connected to the stub shaft.

Axially outboard from the plurality of teeth 826 on the outer surface 822 of the increased diameter portion 824 of the differential side gear 816 is a pair of radially oriented spider gears 860 and 862 having an outer surface 864 and 866. Extending from at least a portion of the outer surface 864 and 866 of the pair of spider gears 860 and 862 is a plurality of teeth 868 and 870 that are complementary to and meshingly engaged with the plurality of teeth 826 on the increased diameter portion 824 of the first end portion 818 of the differential side gear 816.

Extending co-axially with the axle half shaft 802 and radially outboard from the differential side gear 816 and the pair of spider gears 860 and 862 is a differential case 872 having an inner surface 874 and an outer surface 876. The inner surface 874 and the outer surface 876 of the differential case 872 defines a hollow portion 878 therein.

A substantially cylindrical body portion 880 extends co-axially with the axle half shaft 802 and axially outboard from the outer surface 876 of the differential case 872. The substantially cylindrical body portion 880 has a first end portion 882, a second end portion 884, an inner surface 886 and an outer surface 888. The inner surface 886 and the outer surface 888 of the substantially cylindrical body portion 880 defines a hollow portion 890 therein. Circumferentially extending axially outboard from the second end portion 884 of the substantially cylindrical body portion 880 is a plurality of clutch teeth 892. In a non-limiting example, the plurality of clutch teeth 892 on the second end potion 884 of the substantially cylindrical body portion 880 is a plurality of face clutch teeth, a plurality of dog clutch teeth or a friction clutch.

Disposed radially outboard from the axle half shaft 802 is the axle disconnect and differential locking system 800 having an axle disconnect collar 894, a differential locking collar 896, a biasing member 898 and a snap ring 900. Located radially outboard from and extending co-axially with the axle half shaft 802 is the axle disconnect collar 894 having a first end portion 902, a second end portion 904, an inner surface 906 and an outer surface 908. The inner surface 906 and the outer surface 908 of the axle disconnect collar 894 defines a hollow portion 910 therein. Circumferentially extending from the inner surface 906 of the axle disconnect collar 894 is a plurality of splines 912 that are complementary to and meshingly engaged with the plurality of splines 812 on the outer surface 808 of the axle half shaft 802.

Extending from the outer surface 908 of the first end portion 902 of the axle disconnect collar 894 is an increased diameter portion 914 having a first end portion 916 and a second end portion 918. Circumferentially extending axially outboard from the first end portion 916 of the increased diameter portion 914 is a plurality of clutch teeth 920 that are complementary to the plurality of clutch teeth 856 on the increased diameter portion 850 on the second end portion 840 of the stub shaft 836. In a non-limiting example, the plurality of clutch teeth 920 on the increased diameter portion 914 of the axle disconnect collar 894 is a plurality of face clutch teeth, a plurality of dog clutch teeth or a friction clutch.

The axle disconnect collar 894 further includes a channel 922 that is co-axial with the axle half shaft 802 and extends circumferentially along at least a portion of the outer surface 908 of the second end portion 904 of the axle disconnect collar 894.

Disposed radially outboard from the channel 922 on the second end portion 904 of the axle disconnect collar 894 and co-axial with the axle half shaft 802 is the snap ring 900 having a top portion 924, a bottom portion 926, an inner surface 928 and an outer surface 930. The inner surface 928 and the outer surface 930 of the snap ring 900 defines a hollow portion 932 therein. At least a portion, of the bottom portion 926, of the snap ring 900 is disposed within the channel 922 on the second end portion 904 of the axle disconnect collar 894.

According to an alternative embodiment of the disclosure (not shown), the second end portion of the axle disconnect collar has an increased diameter portion (not shown) extending from the outer surface of the second end portion of axle disconnect collar as opposed to the channel 922 and the snap ring 900 illustrated in FIGS. 10-12.

Disposed radially outboard from the axle disconnect collar 894 and extending co-axially with the axle half shaft 802, is the differential locking collar 896 having a first end portion 934, a second end portion 936, an inner surface 938 and an outer surface 940. The inner surface 938 and the outer surface 940 of the differential locking collar 896 defines a hollow portion 942 therein.

Circumferentially extending axially outboard from the first end portion 934 of the differential locking collar 896 is a plurality of clutch teeth 944 that are complementary to the plurality of clutch teeth 892 on the second end portion 884 of the substantially cylindrical body portion 880. In a non-limiting example, the plurality of clutch teeth 944 on the first end portion 934 of the differential locking collar 896 is a plurality of face clutch teeth, a plurality of dog clutch teeth or a friction clutch.

As illustrated in FIGS. 10-12, the differential locking collar 896 further includes a protruding portion 946 that extends radially inboard from the inner surface 938 of the second end portion 936 of the differential locking collar 896 toward the axle disconnect collar 894. The protruding portion 946 on the inner surface 938 of the second end portion 936 of the differential locking collar 896 is disposed axially inboard from the snap ring 900 or the increased diameter portion (not shown) on the second end portion 904 of the axle disconnect collar 894.

According to an alternative embodiment, the differential locking collar 896 further includes a channel 948 that is co-axial with the axle half shaft 802 and extends circumferentially along the outer surface 940 of the differential locking collar 896.

Disposed between the outer surface 908 of the axle disconnect collar 894 and the inner surface 938 of the differential locking collar 896 is the biasing member 898 having a first end portion 950, a second end portion 952, an inner surface 954 and an outer surface 956. The inner surface 954 and the outer surface 956 of the biasing member 898 defines a hollow portion 958 therein. Axially inboard from the plurality of clutch teeth 920 on the first end portion 902 of the axle disconnect collar 894 is the first end portion 950 of the biasing member 898 and axially inboard from the protruding portion 946 is the second end portion 952 of the biasing member 898. In a non-limiting example, the biasing member 898 is a spring or any other device that can be compressed and/or pulled but will return to its former shape when released.

In order to transition the axle disconnect and differential locking system 800 from a first position 960, to a second position 962 and a third position 964 an actuator 966 is used. The actuator 966 is disposed radially outboard from the axle disconnect and differential locking system 800 and has an axis that is substantially parallel to the axle half shaft 802. In a non-limiting example, the actuator 966 is a piston, a pneumatic piston or a pneumatic actuator. The actuator 966 is drivingly connected to a shift shaft 968 which in turn is drivingly connected to an end of a shift fork 970. An end of the shift fork 970 opposite the shift shaft 968 is then drivingly connected the outer surface 940 of the differential locking collar 896.

According to an embodiment illustrated in FIGS. 10-12, where the outer surface 940 of the differential locking collar 896 includes the channel 748, at least a portion of the end of the shift fork 970 opposite the shift shaft 968 extends into the channel 948. When in the channel 948 the differential locking collar 896 will be able to freely rotate while the shift fork 970 remains in place.

FIG. 10 schematically illustrates the axle disconnect and differential locking system 800 being in the first position 960. When in the first position 960, the plurality of clutch teeth 920 on the first end portion 902 of the increased diameter portion 914 of the axle disconnect collar 894 are not meshingly engaged with the plurality of clutch teeth 856 on the second end portion 840 of the stub shaft 836 defining a gap 972 therebetween. In this position, the axle half shaft 802 is disconnected from the differential side gear 816 thereby preventing the rotational energy from the differential side gear 816 to be transferred to the axle half shaft 802.

Additionally, when the axle disconnect and differential locking system 800 is in the first position 960 illustrated in FIG. 10, the plurality of clutch teeth 944 on the first end portion 934 of the differential locking collar 896 are not meshingly engaged with the plurality of clutch teeth 892 on the second end portion 884 of the substantially cylindrical body portion 880 defining a gap 974 therebetween. In this position, the differential 814 is unlocked allowing a differential action to occur within the differential 814 which allows the outer drive wheel(s) (not shown) of a wheeled vehicle (not shown) to rotate at a faster rate than the inner drive wheel(s) (not shown).

FIG. 11 schematically illustrates the axle disconnect and differential locking system 800 being in the second position 962. In order to translate the axle disconnect and differential locking system 800 axially to the second position 962, the actuator 966 extends axially outboard driving the shift fork 970 which in turn drives the differential locking collar 896 and compresses the biasing member 898 loading it with energy. The energy loaded in the biasing member 898 provides the force necessary to translate the axle disconnect collar 894 axially engaging the plurality of clutch teeth 920 on the axle disconnect collar 894 with the plurality of clutch teeth 856 on the second end portion 840 of the stub shaft 836. Additionally, the biasing member 898 allows for full travel of the actuator 966 regardless of the clutch state even if the plurality of clutch teeth 856 and 920 are blocked. Once the plurality of clutch teeth 856 and 920 are unblocked, the energy stored in the biasing member 898 will force the axle disconnect collar 894 to translate axially and meshingly engage the plurality of clutch teeth 920 on the axle disconnect collar 894 with the plurality of clutch teeth 856 on the second end portion 840 of the stub shaft 836. In this position, the axle half shaft 802 is connected to the differential side gear 816 thereby allowing the rotational energy from the differential side gear 816 to be transferred to the axle half shaft 802.

Additionally, when in the second position 962 illustrated in FIG. 11, the plurality of clutch teeth 944 on the first end portion 934 of the differential locking collar 896 are not meshingly engaged with the plurality of clutch teeth 892 on the second end portion 884 of the substantially cylindrical body portion 880 defining a gap 976 therebetween. In this position, the differential 814 is unlocked allowing a differential action to occur within the differential 814 which allows the outer drive wheel(s) (not shown) of a wheeled vehicle (not shown) to rotate at a faster rate than the inner drive wheel(s) (not shown).

FIG. 12 schematically illustrates the axle disconnect and differential locking system 800 being in the third position 964. In order to translate the axle disconnect and differential locking system 800 axially to the third position 964, the actuator 966 extends axially outboard driving the shift fork 970 which in turn drives the differential locking collar 896. When in this position, the plurality of clutch teeth 944 on the differential locking collar 896 are meshingly engaged with the plurality of clutch teeth 892 on the substantially cylindrical body portion 880. In this position, the differential 814 is locked thereby preventing a differential action from occurring within the differential 814. Locking the differential 814 restricts the rotation of the wheel(s) (not shown) to the same speed as if they were mounted on a common shaft, thereby allowing the vehicle (not shown) to experience an increase in traction.

Furthermore, when the axle disconnect and differential locking system 800 is in the third position 964 illustrated in FIG. 12, the plurality of clutch teeth 920 on the axle disconnect collar 894 are meshingly engaged with the plurality of clutch teeth 856 on the second end portion 840 of the stub shaft 836. As previously discussed, in this position, the axle half shaft 802 is connected to the differential side gear 816 thereby allowing the rotational energy from the differential side gear 816 to be transferred to the axle half shaft 802.

In order to unlock the differential 814 and transition the axle disconnect and differential locking system 800 from the third position 964 illustrated in FIG. 12 to the second position 962 illustrated in FIG. 11 the actuator 966 axially retracts. When the actuator 966 retracts it moves the shift fork 970 which in turn drives the differential locking collar 896 and disengages the differential locking collar 896 from the substantially cylindrical body portion 880 of the differential case 872. As previously discussed, when in this position the plurality of clutch teeth 944 on the differential locking collar 896 are not meshingly engaged with the plurality of clutch teeth 892 on the substantially cylindrical body portion 880.

In order to disconnect the axle half shaft 802 from the differential side gear 816 and transition the axle disconnect and differential locking system 800 from the second position 962 illustrated in FIG. 11 to the first position 960 illustrated in FIG. 10 the actuator 966 again axially retracts. When the actuator 966 retracts it moves the shift fork 970 which in turn drives the differential locking collar 896 contacting the snap ring 900 or the increased diameter portion (not shown) on the second end portion 904 of the axle disconnect collar 894. Once the differential locking collar 896 contacts the snap ring 900 or the increased diameter portion (not shown) on the second end portion 904 of the axle disconnect collar 894, it drives the axle disconnect collar 894 and disengages the axle disconnect collar 894 from the stub shaft 836. As previously discussed, when in this position the plurality of clutch teeth 920 on the axle disconnect collar 894 are not meshingly engaged with the plurality of clutch teeth 856 on the stub shaft 836.

Figure 13:
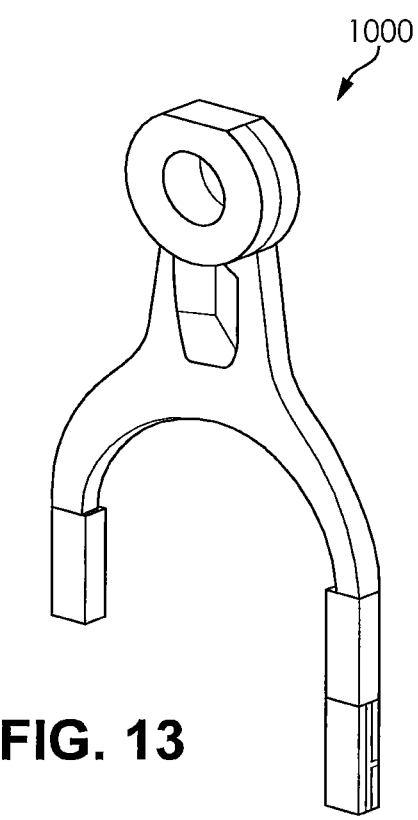
FIG. 13 is a schematic perspective view of a shift fork according to an embodiment of the disclosure.

FIG. 13 provides a perspective view of a schematically illustrated shift fork according to one embodiment of the disclosure. As a non-limiting example, the shift fork 496, 752 and 970 described in relation to FIGS. 4-12 may take the form of the shift fork 1000 illustrated in FIG. 13.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A disconnect and differential locking system, comprising:
   an axle half shaft having a first end portion, a second end portion and an outer surface;
      wherein said outer surface of said axle half shaft has a plurality of axle half shaft splines circumferentially extending therefrom;
   a differential side gear having a first end portion, a second end portion and an outer surface;
      wherein a plurality of differential side gear splines circumferentially extend from said outer surface of said differential side gear axially inboard from said plurality of teeth on said first end portion of said differential side gear;
      wherein said second end portion of said differential side gear is rotatably connected to said first end portion of said shaft axle half shaft;
   a differential case having an inner surface and an outer surface;
      wherein said outer surface of said differential case has a body portion having a first end portion, a second end portion, an inner surface and an outer surface;
      wherein said body portion extends axially outboard from said outer surface of said differential case and is co-axial with said axle half shaft;
      wherein said second end portion of said body portion has a plurality of body portion clutch teeth extending circumferentially and axially outboard therefrom;
   a sliding collar having a first end portion, a second end portion, an inner surface and an outer surface;
      wherein said sliding collar has a first position, second position and a third position;
      wherein said sliding collar is selectively engagable with at least one of said differential side gear and said differential case;
      wherein said inner surface of said sliding collar has a plurality of sliding collar splines circumferentially extending therefrom;
      wherein said first end portion of said sliding collar has a plurality of sliding collar clutch teeth extending circumferentially and axially outboard from said first end portion of said sliding collar;
   a shift fork having a first end portion and a second end portion;
      wherein said first end portion of said shift fork is drivingly connected to said outer surface of said sliding collar;
   a shift shaft having a first end portion, a second end portion and an outer surface;
      wherein said outer surface of said shift shaft is integrally connected to said second end portion of said shift fork; and
   an actuator integrally connected to said shift shaft.

2. The disconnect and differential locking system of claim 1, wherein at said first position said plurality of sliding collar splines are meshingly engaged with said plurality of axle half shaft splines.

3. The disconnect and differential locking system of claim 1, wherein at said second position at least a portion of said plurality of sliding collar splines are meshingly engaged with said plurality of axle half shaft splines;
   wherein at least a portion of said plurality of sliding collar splines are meshingly engaged with said plurality of differential side gear splines; and
   wherein said plurality of sliding collar clutch teeth are not meshingly engaged with said plurality of body portion clutch teeth defining a gap therebetween.

4. The disconnect and differential locking system of claim 1, wherein at said third position at least a portion of said plurality of sliding collar splines are meshingly engaged with said plurality of axle half shaft splines;
   wherein at least a portion of said plurality of sliding collar splines are meshingly engaged with said plurality of differential side gear splines; and
   wherein said plurality of sliding collar clutch teeth are meshingly engaged with said plurality of body portion clutch teeth.

5. The disconnect and differential locking system of claim 1, wherein said sliding collar further comprises a channel on said outer surface of said sliding collar; wherein said channel on said outer surface of said sliding collar is co-axial with said axle half shaft;
   wherein said channel on said outer surface of said sliding collar extends circumferentially along said outer surface of said sliding collar; and
   wherein at least a portion of said first end portion of said shift fork extends into said channel on said outer surface of said sliding collar.

6. A disconnect and differential locking system, comprising:
   an axle half shaft having a first end portion, a second end portion and an outer surface;
      wherein said outer surface of said axle half shaft has a plurality of axle half shaft splines circumferentially extending therefrom;
   a differential side gear having a first end portion, a second end portion and an outer surface;
      wherein said second end portion of said differential side gear further comprises a plurality of differential side gear clutch teeth extending circumferentially and axially outboard therefrom;
      wherein said second end portion of said differential side gear is rotatably connected to said first end portion of said axle half shaft;
   a differential case having an inner surface and an outer surface;
      wherein said outer surface of said differential case has a body portion having a first end portion, a second end portion, an inner surface and an outer surface;
      wherein said body portion extends axially outboard from said outer surface of said differential case and is co-axial with said axle half shaft;
      wherein said second end portion of said body portion has a plurality of body portion clutch teeth extending circumferentially and axially outboard therefrom;
   an axle disconnect and differential locking system having an axle disconnect collar, a differential locking collar and a biasing member;
      wherein said axle disconnect and differential locking system has a first position, second position and a third position;
      wherein said axle disconnect and differential locking system is selectively engagable with at least one of said differential side gear and said differential case;

said axle disconnect collar having a first end portion, a second end portion, an inner surface and an outer surface;
  wherein said axle disconnect collar is selectively engagable with said differential side gear;
  wherein said inner surface of said axle disconnect collar has a plurality of axle disconnect collar splines circumferentially extending therefrom;
  wherein said plurality of axle disconnect collar splines are complementary to and meshingly engaged with said plurality of axle half shaft splines;
  wherein said first end portion of said axle disconnect collar further comprises an increased diameter portion extending from said outer surface of said second end portion of said axle disconnect collar;
  wherein said first end portion of said axle disconnect collar has a plurality of axle disconnect collar clutch teeth extending circumferentially and axially outboard therefrom;
  wherein said second end portion of said axle disconnect collar has an increased diameter portion;
said differential locking collar having a first end portion, a second end portion, an inner surface and an outer surface;
  wherein said differential locking collar is disposed radially outboard from said axle disconnect collar;
  wherein said differential locking collar is selectively engagable with said differential case;
  wherein said first end portion of said differential locking collar has a plurality of differential locking collar clutch teeth extending circumferentially and axially outboard therefrom;
  wherein said inner surface of said second end portion of said differential locking collar has a protruding portion extending from said inner surface of said second end portion of said differential locking collar;
  wherein said protruding portion on said inner surface of said differential locking collar is disposed axially inboard from said increased diameter portion on said second end portion of said axle disconnect collar;
said biasing member having a first end portion, a second end portion, an inner surface and an outer surface;
  wherein said biasing member is disposed between said axle disconnect collar and said differential locking collar;
a shift fork having a first end portion and a second end portion;
  wherein said first end portion of said shift fork is drivingly connected to said outer surface of said differential locking collar;
a shift shaft having a first end portion, a second end portion and an outer surface;
  wherein said outer surface of said shift shaft is integrally connected to said second end portion of said shift fork; and
an actuator integrally connected to said shift shaft.

7. The disconnect and differential locking system of claim 6, wherein said differential locking collar further comprises a channel on said outer surface of said differential locking collar;
  wherein said channel on said outer surface of said differential locking collar is co-axial with said axle half shaft;
  wherein said channel on said outer surface of said differential locking collar extends circumferentially along said outer surface of said differential locking collar; and
  wherein at least a portion of said first end portion of said shift fork extends into said channel on said outer surface of said differential locking collar.

8. The disconnect and differential locking system of claim 6, wherein said increased diameter portion on said second end portion of said axle disconnect collar is a snap ring having a top portion, a bottom portion, an inner surface and an outer surface;
  wherein said axle disconnect collar further comprises a channel on said outer surface of said second end portion of said axle disconnect collar;
  wherein said channel on said second end portion of said axle disconnect collar is co-axial with said axle half shaft;
  wherein said channel on said second end portion of said axle disconnect collar extends circumferentially along at least a portion of said outer surface of said second end portion of said axle disconnect collar; and
  wherein at least a portion of said bottom portion of said snap ring extends into said channel on said second end portion of said axle disconnect collar.

9. The disconnect and differential locking system of claim 6, wherein at said first position said plurality of axle disconnect collar clutch teeth are not meshingly engaged with said plurality of differential side gear clutch teeth defining a gap therebetween, and said plurality of differential locking collar clutch teeth are not meshingly engaged with said plurality of body portion clutch teeth defining a gap therebetween.

10. The disconnect and differential locking system of claim 6, wherein at said second position said plurality of axle disconnect collar clutch teeth are meshingly engaged with said plurality of differential side gear clutch teeth, and said plurality of differential locking collar clutch teeth are not meshingly engaged with said plurality of body portion clutch teeth defining a gap therebetween.

11. The disconnect and differential locking system of claim 6, wherein at said third position said plurality of axle disconnect collar clutch teeth are meshingly engaged with said plurality of differential side gear clutch teeth, and said plurality of differential locking collar clutch teeth are meshingly engaged with said plurality of body portion clutch teeth.

12. A disconnect and differential locking system, comprising:
  an axle half shaft having a first end portion, a second end portion and an outer surface;
    wherein said outer surface of said axle half shaft has a plurality of axle half shaft splines circumferentially extending therefrom;
  a stub shaft having a first end portion, a second end portion and an outer surface;
    wherein said second end portion of said stub shaft is rotatably connected to said first end portion of said axle half shaft;
    wherein said second end portion of said stub shaft further comprises a plurality of stub shaft clutch teeth extending circumferentially and axially outboard therefrom;
  a differential side gear having a first end portion, a second end portion and an outer surface;
    wherein said second end portion of said differential side gear is drivingly connected to said first end portion of said stub shaft;
  a differential case having an inner surface and an outer surface;

wherein said outer surface of said differential case has a body portion having a first end portion, a second end portion, an inner surface and an outer surface;

wherein said body portion extends axially outboard from said outer surface of said differential case and is co-axial with said axle half shaft;

wherein said second end portion of said body portion has a plurality of body portion clutch teeth extending circumferentially and axially outboard therefrom;

an axle disconnect and differential locking system having an axle disconnect collar, a differential locking collar and a biasing member;

wherein said axle disconnect and differential locking system has a first position, a second position and a third position;

wherein said axle disconnect and differential locking system is selectively engagable with at least one of said stub shaft and said differential case;

said axle disconnect collar having a first end portion, a second end portion, an inner surface and an outer surface;

wherein said axle disconnect collar is selectively engagable with said stub shaft;

wherein said inner surface of said axle disconnect collar has a plurality of axle disconnect collar splines circumferentially extending therefrom;

wherein said plurality of axle disconnect collar splines are complementary to and meshingly engaged with said plurality of axle half shaft splines;

wherein said first end portion of said axle disconnect collar further comprises an increased diameter portion extending from said outer surface of said second end portion of said axle disconnect collar;

wherein first end portion of said axle disconnect collar has a plurality of axle disconnect collar clutch teeth extending circumferentially and axially outboard therefrom;

wherein said second end portion of said axle disconnect collar has an increased diameter portion;

said differential locking collar having a first end portion, a second end portion, an inner surface and an outer surface;

wherein said differential locking collar is disposed radially outboard from said axle disconnect collar;

wherein said differential locking collar is selectively engagable with said differential case;

wherein said first end portion of said differential locking collar has a plurality of differential locking collar clutch teeth extending circumferentially and axially outboard therefrom;

wherein said inner surface of said second end portion of said differential locking collar has a protruding portion extending from said inner surface of said second end portion of said differential locking collar;

wherein said protruding portion on said inner surface of said differential locking collar is disposed axially inboard from said increased diameter portion on said second end portion of said axle disconnect collar;

said biasing member having a first end portion, a second end portion, an inner surface and an outer surface;

wherein said biasing member is disposed between said axle disconnect collar and said differential locking collar;

a shift fork having a first end portion and a second end portion;
wherein said first end portion of said shift fork is drivingly connected to said outer surface of said differential locking collar;

a shift shaft having a first end portion, a second end portion and an outer surface;
wherein said outer surface of said shift shaft is integrally connected to said second end portion of said shift fork; and an actuator integrally connected to said shift shaft.

13. The disconnect and differential locking system of claim 12, wherein said differential locking collar further comprises a channel on said outer surface of said differential locking collar;

wherein said channel on said outer surface of said differential locking collar is co-axial with said axle half shaft;

wherein said channel on said outer surface of said differential locking collar extends circumferentially along said outer surface of said differential locking collar; and wherein at least a portion of said first end portion of said shift fork extends into said channel on said outer surface of said differential locking collar.

14. The disconnect and differential locking system of claim 12, wherein said increased diameter portion on said second end portion of said axle disconnect collar is a snap ring having a top portion, a bottom portion, an inner surface and an outer surface;

wherein said axle disconnect collar further comprises a channel on said outer surface of said second end portion of said axle disconnect collar;

wherein said channel on said second end portion of said axle disconnect collar is co-axial with said axle half shaft;

wherein said channel on said second end portion of said axle disconnect collar extends circumferentially along at least a portion of said outer surface of said second end portion of said axle disconnect collar; and wherein at least a portion of said bottom portion of said snap ring extends into said channel on said second end portion of said axle disconnect collar.

15. The disconnect and differential locking system of claim 12, wherein at said first position said plurality of axle disconnect collar clutch teeth are not meshingly engaged with said plurality of stub shaft clutch teeth defining a gap therebetween, and said plurality of differential locking clutch teeth are not meshingly engaged with said plurality of body portion clutch teeth defining a gap therebetween.

16. The disconnect and differential locking system of claim 12, wherein at said second position said plurality of axle disconnect collar clutch teeth are meshingly engaged with said plurality of stub shaft clutch teeth, and said plurality of differential locking collar clutch teeth are not meshingly engaged with said plurality of body portion clutch teeth defining a gap therebetween.

17. The disconnect and differential locking system of claim 12, wherein at said third position said plurality of axle disconnect collar clutch teeth are meshingly engaged with said plurality of stub shaft clutch teeth, and said plurality of differential locking collar clutch teeth are meshingly engaged with said plurality of body portion clutch teeth.

* * * * *